US010616426B2

(12) United States Patent
Hanada

(10) Patent No.: US 10,616,426 B2
(45) Date of Patent: Apr. 7, 2020

(54) INFORMATION PROCESSING IN WHICH SETTING ITEM LIST IS SCROLLED WHEN SELECTION GESTURE IS PERFORMED ON SHORTCUT BUTTON

(71) Applicant: KYOCERA Document Solutions Inc., Osaka (JP)

(72) Inventor: Naoto Hanada, Osaka (JP)

(73) Assignee: KYOCERA Document Solutions Inc., Tamatsukuri, Chuo-ku, Osaka (JP)

(*) Notice: Subject to any disclaimer, the term of this patent is extended or adjusted under 35 U.S.C. 154(b) by 0 days.

(21) Appl. No.: 15/950,544

(22) Filed: Apr. 11, 2018

(65) Prior Publication Data
US 2018/0316805 A1 Nov. 1, 2018

(30) Foreign Application Priority Data

Apr. 26, 2017 (JP) ................... 2017-087265
Apr. 26, 2017 (JP) ................... 2017-087266

(51) Int. Cl.
*H04N 1/00* (2006.01)
*G06F 3/0482* (2013.01)
(Continued)

(52) U.S. Cl.
CPC ..... *H04N 1/00411* (2013.01); *G03G 15/5016* (2013.01); *G06F 3/0482* (2013.01);
(Continued)

(58) Field of Classification Search
CPC ............. H04N 1/00411; H04N 1/6008; H04N 1/00384; H04N 1/00413; H04N 1/00408;
(Continued)

(56) References Cited

U.S. PATENT DOCUMENTS

| 2007/0176946 | A1* | 8/2007 | Matoba | ................ | G06F 3/0482 345/619 |
| 2010/0001967 | A1* | 1/2010 | Yoo | ....................... | G06F 3/0488 345/173 |
| 2015/0172481 | A1* | 6/2015 | Komaba | ............ | H04N 1/00411 358/1.13 |

FOREIGN PATENT DOCUMENTS

JP 2008-018541 A 1/2008

OTHER PUBLICATIONS

Extended European Search Report dated Jul. 6, 2018 mailed in the corresponding European Patent Application No. 18167729.5.

* cited by examiner

*Primary Examiner* — Christopher Wait
(74) *Attorney, Agent, or Firm* — IP Business Solutions, LLC

(57) ABSTRACT

An information processing device includes: a display section displaying a setting screen receiving change in a setting candidate of a plurality of respective setting items; and a control unit including a processor and functioning as a display control section, gesture receiving section, and setting candidate receiving section when the processor executes a control program. The setting screen includes a setting item list in which images respectively indicating each of the plurality of setting items are listed, and a shortcut button associated with a predetermined setting candidate of a predetermined setting item. In the setting item list, information representing the setting candidate set at present is shown in the images respectively indicating each of the plurality of setting items. When the gesture receiving section receives a selection gesture performed on the shortcut button, the setting candidate receiving section receives change to the setting candidate associated with the selected shortcut button.

10 Claims, 20 Drawing Sheets

(51) Int. Cl.
*G06F 3/0485* (2013.01)
*G06F 3/0488* (2013.01)
*G03G 15/00* (2006.01)
*H04N 1/60* (2006.01)
*G06F 9/451* (2018.01)

(52) U.S. Cl.
CPC .......... *G06F 3/0485* (2013.01); *G06F 3/0488* (2013.01); *G06F 3/04883* (2013.01); *H04N 1/00381* (2013.01); *H04N 1/00384* (2013.01); *H04N 1/00408* (2013.01); *H04N 1/00413* (2013.01); *H04N 1/6008* (2013.01); *G03G 15/502* (2013.01); *G06F 9/451* (2018.02)

(58) Field of Classification Search
CPC .. G06F 3/04883; G06F 3/0488; G06F 3/0485; G06F 3/0482; G06F 9/451; G03G 15/5016; G03G 15/502
See application file for complete search history.

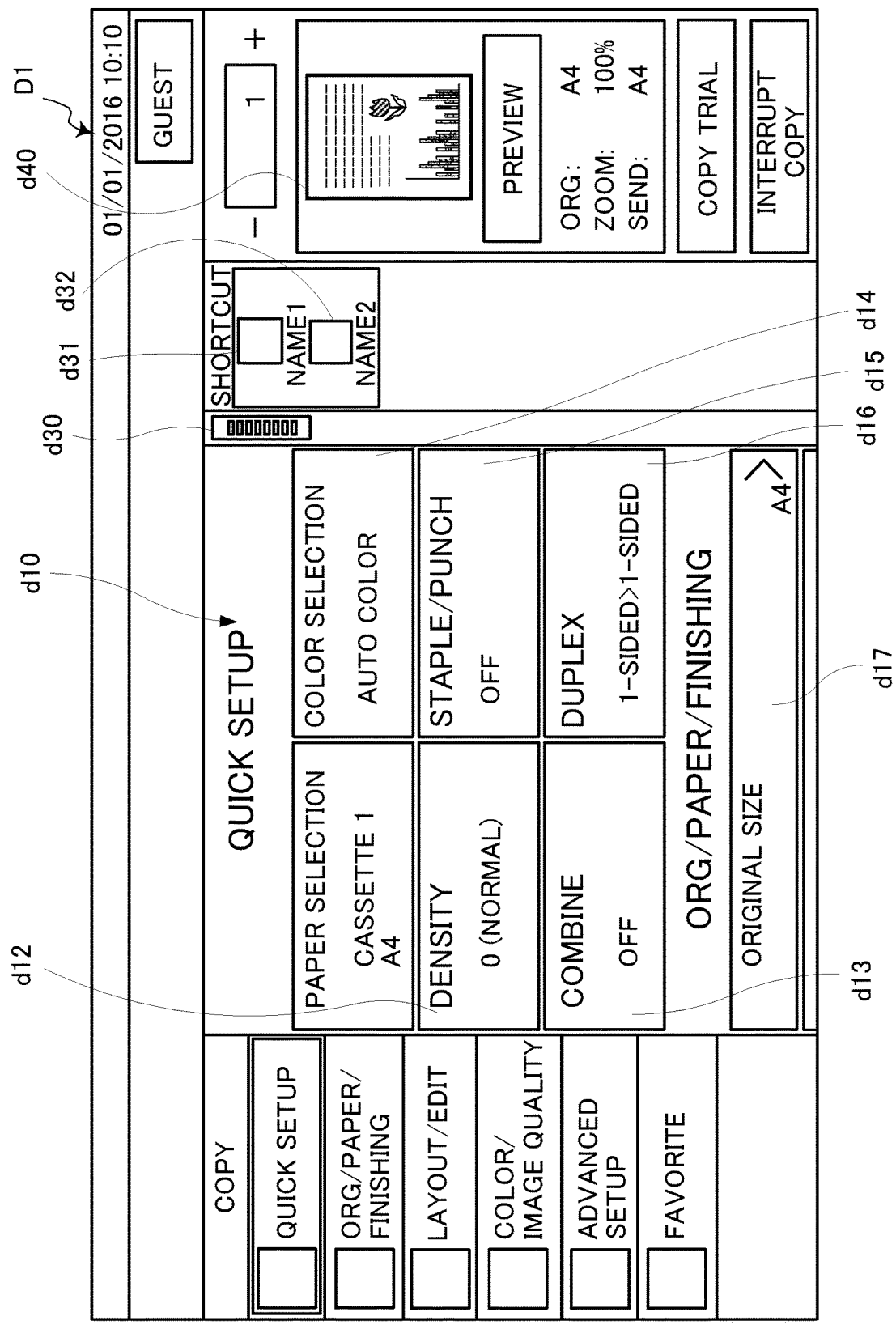

INFORMATION PROCESSING IN WHICH SETTING ITEM LIST IS SCROLLED WHEN SELECTION GESTURE IS PERFORMED ON SHORTCUT BUTTON

INCORPORATION BY REFERENCE

This application claims priority to Japanese Patent Application No. 2017-087265 filed on 26 Apr. 2017, and Japanese Patent Application No. 2017-087266 filed on 26 Apr. 2017, the entire contents of which are incorporated by reference herein.

BACKGROUND

The present disclosure relates to information processing devices, image forming apparatuses, and computer-readable non-transitory recording media with an information processing program stored thereon, and particularly to a technique for changing setting candidates of a plurality of respective setting items.

In recent years, along with advancement in equipment, image forming apparatuses, mobile devices such as smartphones, and personal computers, each of which having numbers of setting items, have been produced. The equipment of the kind is provided with a display section of, for example, a liquid crystal display (LCD) or an organic light-emitting diode (OLED), and the display section is controlled to display a setting screen including a setting item list on which a plurality of setting items are listed.

SUMMARY

A technique improved over the aforementioned technique is proposed as one aspect of the present disclosure.

An information processing device according to one aspect of the present disclosure includes a display section and a control unit. The display section displays a setting screen that receives change in a setting candidate of a plurality of respective setting items settable in the information processing device. The control unit includes a processor and, when the processor executes a control program, functions as: a display control section controlling display operation of the display section; a gesture receiving section receiving a user's gesture; and a setting candidate receiving section receiving, in accordance with the user's gesture received by the gesture receiving section, the change in the setting candidate of the respective setting items. The setting screen includes a setting item list in which images respectively indicating each of the plurality of setting items are listed, and a shortcut button associated with a predetermined setting candidate of a predetermined setting item. In the setting item list, information representing the setting candidate set at present is shown in each of the images respectively indicating each of the plurality of setting items. In a case where the gesture receiving section receives a selection gesture performed on the shortcut button, the setting candidate receiving section receives change to the setting candidate associated with the selected shortcut button.

An image forming apparatus according to another aspect of the present disclosure includes an image forming section and the above-described information processing device. The image forming section forms an image on a recording sheet. The display section displays a setting screen that receives change in a setting candidate of a plurality of respective setting items related to an image formation by the image forming section. The setting candidate receiving section receives, in accordance with the user's gesture received by the gesture receiving section, the change in the setting candidate of the respective setting items related to the image formation by the image forming section. The image forming section executes image forming operation based on the setting candidate of the setting item that the setting candidate receiving section has received.

In a computer-readable non-transitory recording medium with an information processing program stored thereon according to still another aspect of the present disclosure, when the processor executes the information processing program, the information processing program causes a computer including a processor to function as a display control section, a gesture receiving section, and a setting candidate receiving section. The display control section controls display operation of a display section, the display section displaying a setting screen that receives change in a setting candidate of a plurality of respective settable setting items. The gesture receiving section receives a user's gesture. The setting candidate receiving section receives, in accordance with the user's gesture received by the gesture receiving section, the change in the setting candidate of the respective setting items. The information processing program further causes the computer to function so that: the setting screen includes a setting item list in which images respectively indicating each of the plurality of setting items are listed, and a shortcut button associated with a predetermined setting candidate of a predetermined setting item, and in the setting item list, information representing the setting candidate set at present is shown in each of the images respectively indicating each of the plurality of setting items; and in a case where the gesture receiving section receives a selection gesture performed on the shortcut button, the setting candidate receiving section receives change to the setting candidate associated with the selected shortcut button.

BRIEF DESCRIPTION OF THE DRAWINGS

FIG. 8A and FIG. 8B are diagrams each showing an example of the screen displayed on the display section of the image forming apparatus according to the first embodiment of the present disclosure.

DETAILED DESCRIPTION

First Embodiment

Hereinafter, a description will be given, with reference to the drawings, on an information processing device, an image forming apparatus, and an information processing program according to a first embodiment of the present disclosure.

Figure 1:
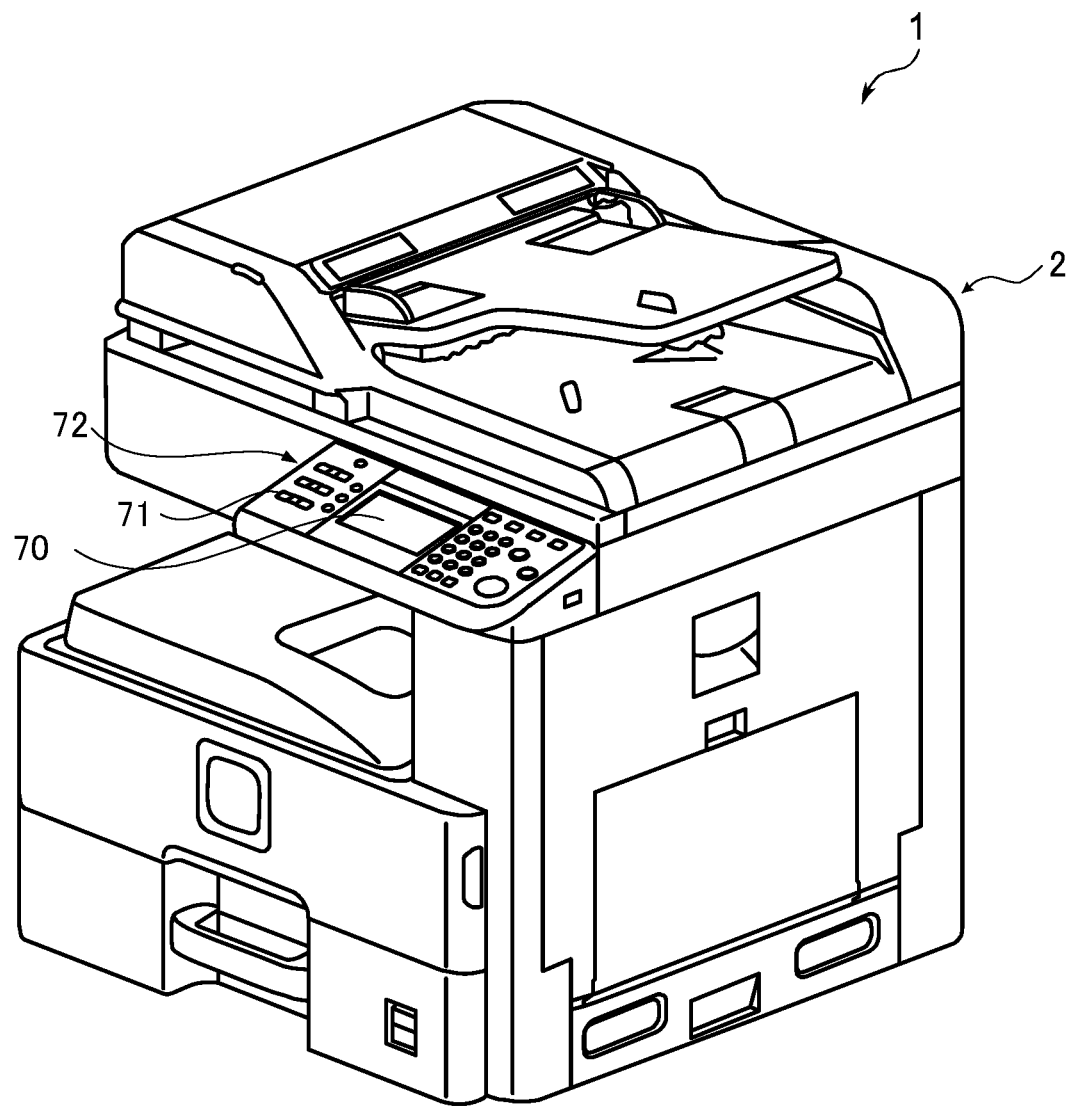
FIG. 1 is a perspective view showing the appearance of an image forming apparatus provided with an image processing device according to a first embodiment of the present disclosure.
Figure 2:
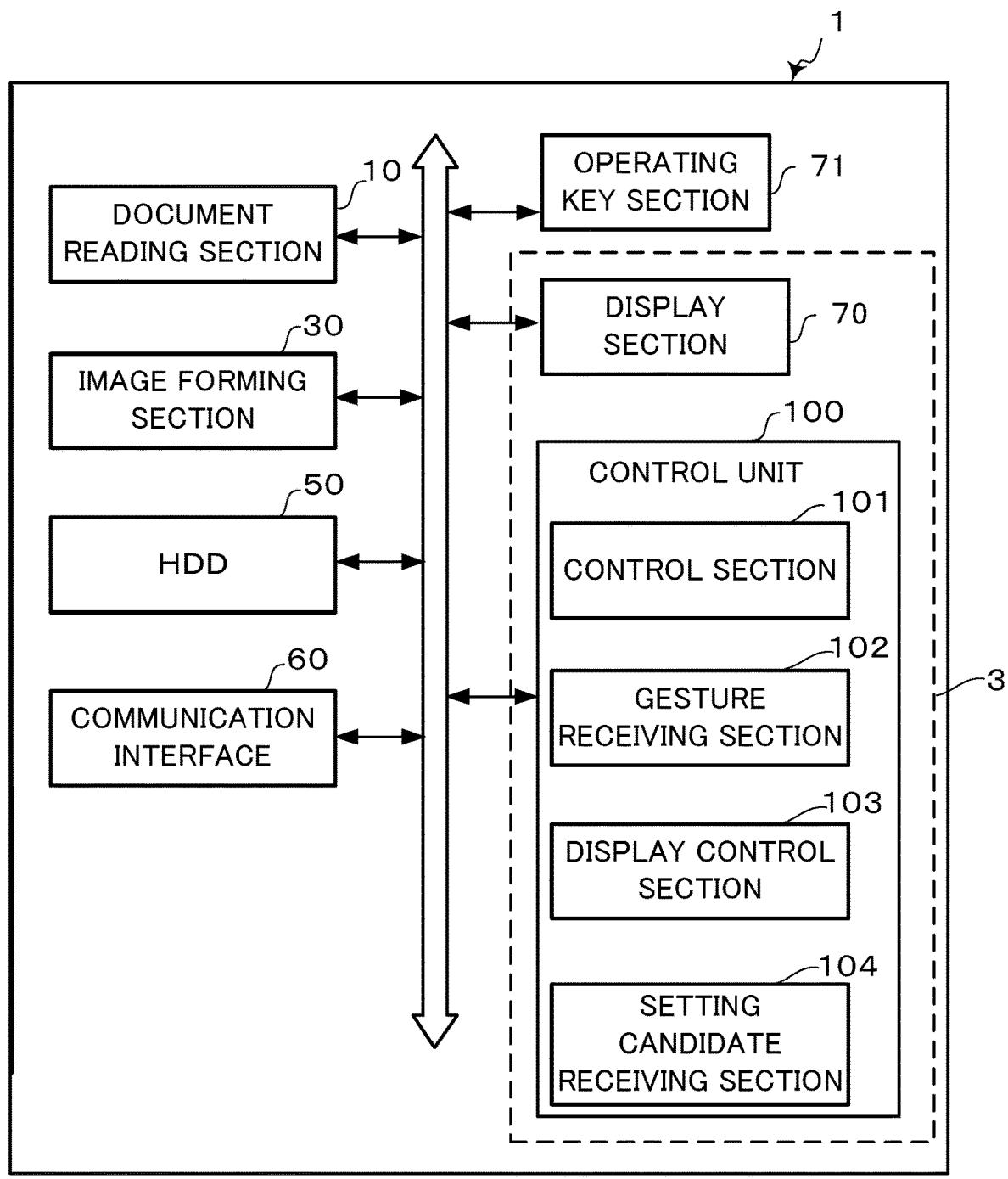
FIG. 2 is a functional block diagram showing an essential part of an internal configuration of the image forming apparatus provided with the image processing device according to the first embodiment of the present disclosure.

FIG. 1 is a perspective view showing the appearance of the image forming apparatus provided with the image processing device according to the first embodiment of the present disclosure. FIG. 2 is a functional block diagram showing an essential part of an internal configuration of the image forming apparatus provided with the image processing device according to the first embodiment of the present disclosure.

An image forming apparatus 1 is a multifunction peripheral having a plurality of functions, such as copying, printing, scanning, and facsimile transmission. As illustrated in FIG. 1, the image forming apparatus 1 includes a document reading section 10, an image forming section 30, and so on provided inside an apparatus body 2. The document reading section 10 optically reads an original document placed on an un-illustrated contact glass and forms image data. The image forming section 30 forms an image on a recording sheet by, for example, an electrophotographic system and an ink jet system.

An operation panel 72, which includes a display section 70 and an operating key section 71, is arranged in front of the apparatus body 2.

The display section 70 is formed of a liquid crystal display, an organic light-emitting diode display or the like. The display section 70 displays an operation screen for inputting instructions such as a document reading instruction and an image formation instruction, and a setting screen for performing various kinds of settings.

The operating key section 71 includes, for example, a start key for calling up the operation screen and the setting screen, arrow keys for moving the focus of a GUI forming the operation screen and the setting screen, a determination key for performing a determination operation for the GUI forming the operation screen and the setting screen, and a numeric keypad. The operating key section 71 receives input of a user's gesture performed on the operation screen and the setting screen displayed on the display section 70.

A touch panel of, for example, a so-called resistive film system or a capacitance system may be disposed in front of the display section 70. In that case, the input of the user's gesture performed on the operation screen and the setting screen displayed on the display section 70 is received by a touch gesture performed on the touch panel.

The image forming apparatus 1 includes, in addition to the aforesaid document reading section 10 and image forming section 30, an HDD 50, a communication interface 60, a control unit 100, and so on.

The HDD 50 is a large-capacity storage device, and stores the image data read by the document reading section 10 and a setting candidate received by a setting candidate receiving section 104 (to be described later on) of the control unit 100.

The communication interface 60 includes a communication module such as a LAN chip, and performs data communication among other image forming apparatuses and personal computers and so on connected over a network.

The control unit 100 includes a processor, a random access memory (RAM), a read only memory (ROM), and an exclusive hardware circuit. The processor is, for example, a central processing unit (CPU), a field programmable gate array (FPGA), or an application specific integrated circuit (ASIC). The control unit 100 functions as a control section 101, a gesture receiving section 102, a display control section 103, and the setting candidate receiving section 104 when the processor operates in accordance with a program such as an information processing program stored on the HDD 50. Alternatively, each of the above-mentioned sections may not be implemented by the operation of the control unit 10 in accordance with the program but may be constituted by a hardware circuit. As illustrated in FIG. 2, in the present embodiment, an information processing device 3 includes the control unit 100 and the display section 70.

The control section 101 governs the overall operation control of the image forming apparatus 1. For example, on the basis of each setting candidate stored on the HDD 50, the control section 101 controls the image forming section 30 and forms an image desired by the user on the recording sheet.

On the basis of a signal output from the operating key section 71 or the touch panel disposed in front of the display section 70, the gesture receiving section 102 determines the user's gesture inputted by the user. The gesture receiving section 102 then receives the determined user's gesture and outputs a control signal corresponding to the user's gesture to the display control section 103 and the setting candidate receiving section 104.

The display control section 103 has a function of controlling display operation of the display section 70 in accordance with the user's gesture received by the gesture receiving section 102.

The setting candidate receiving section 104 has a function of receiving, in accordance with the user's gesture received by the gesture receiving section 102, change in a setting candidate of a plurality of respective setting items that can be set at the image forming apparatus 1.

Figure 3:
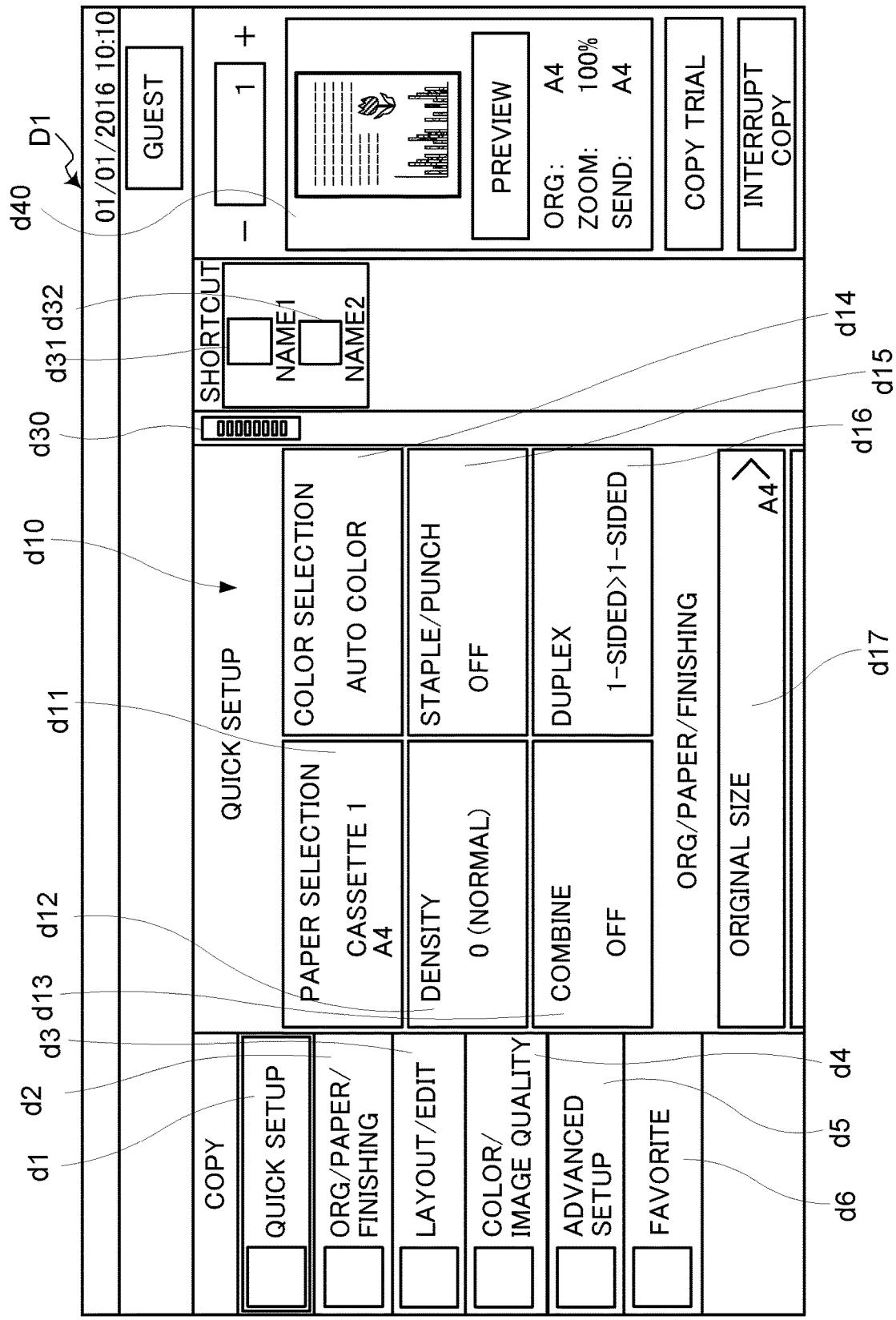
FIG. 3 is a diagram showing an example of a screen displayed on a display section of the image forming apparatus according to the first embodiment of the present disclosure.

FIG. 3 is a diagram showing an example of a screen displayed on the display section 70 under the control of the display control section 103. The example illustrated in FIG. 3 shows a setting screen D1 that is used for performing the settings in executing processing of reading the document to generate the image data and forming, onto the recording sheet, the image based on the generated image data (in other words copy processing).

The setting screen D1 includes the scrolling display area d10 where a predetermined scroll image is scroll-displayed under the control of the display control section 103 in accordance with the scroll gesture that the gesture receiving section 102 has received. A setting item list is displayed on the scrolling display area d10 as the predetermined scroll image. The setting item list is composed of the plurality of setting items listed in a scrolling direction (a vertical direction in the drawing), the setting items being settable in executing the copy processing.

Figure 4:
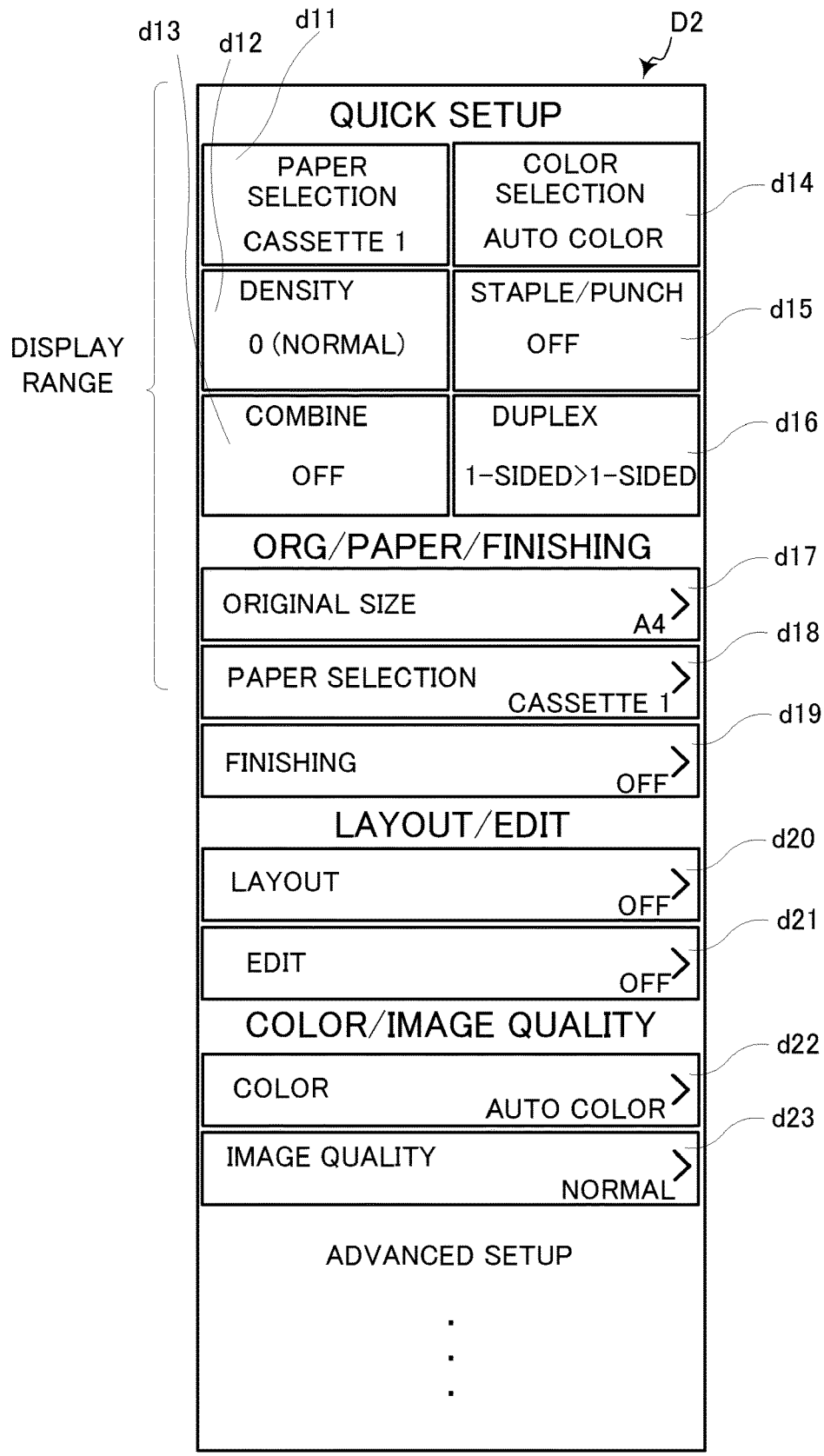
FIG. 4 is a diagram showing an example of a setting item list displayed on a scrolling display area of a setting screen being displayed on the display section of the image forming apparatus according to the first embodiment of the present disclosure.

FIG. 4 is a diagram showing an example of the setting item list displayed on the scrolling display area d10. A setting item list D2 illustrated in FIG. 4 includes images d11 to d23 each indicating the setting item settable in executing the copy processing. Additionally, information representing the setting candidate currently set (default setting candidate) for each of the plurality of setting items is shown in the setting item list D2. For example, the image d18 indicates that "CASSETTE 1" is being set as the default setting candidate of the setting item "PAPER SELECTION" that is for setting a paper feed cassette to feed the recording sheet. In addition, the image d22 indicates that "AUTO COLOR" is being set as the default setting candidate of the setting item "COLOR" that is for setting a color when an image is formed on the recording sheet.

Figure 5:
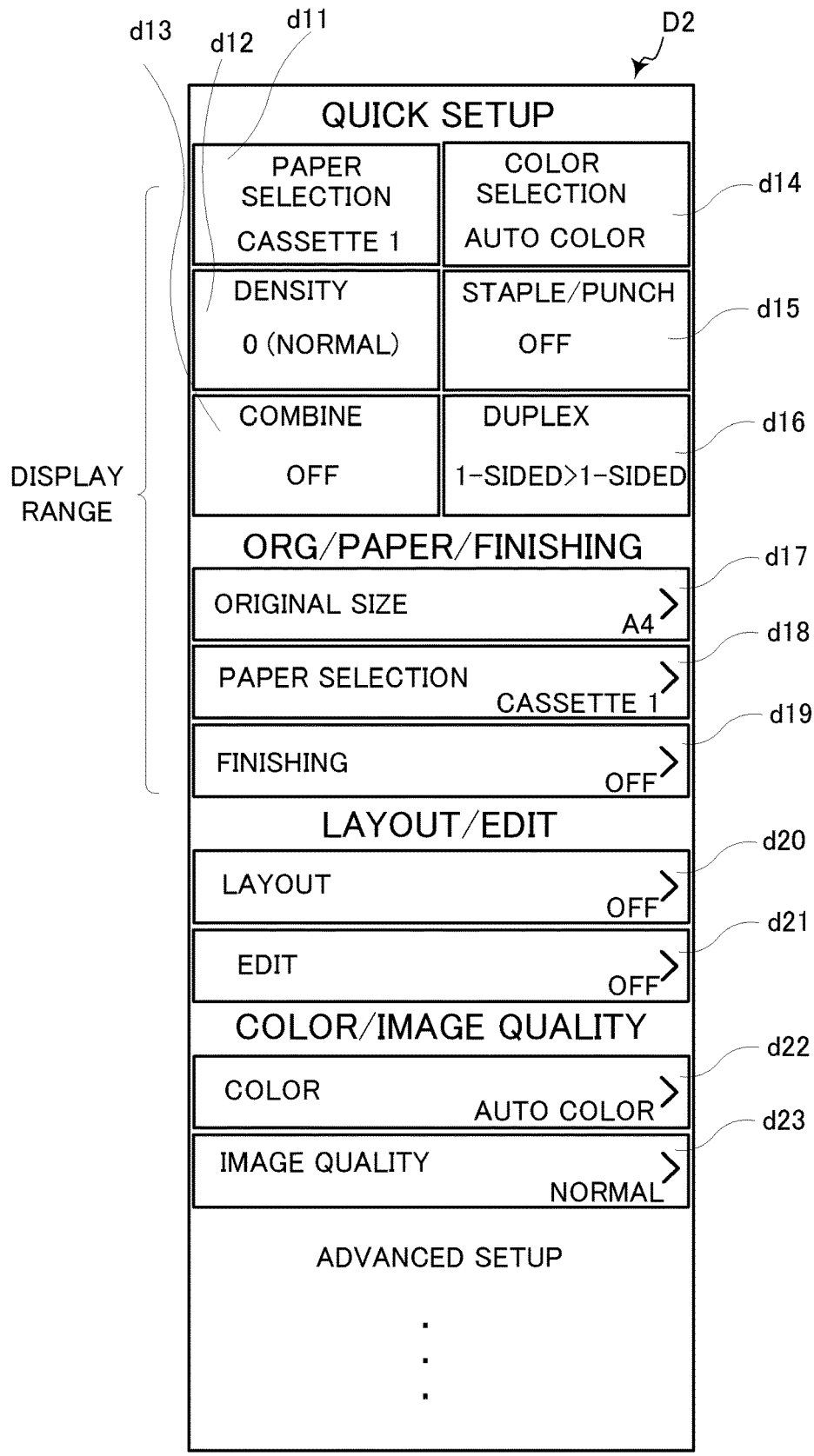
FIG. 5 is a diagram showing an example of a setting item list displayed on a scrolling display area of a setting screen being displayed on the display section of the image forming apparatus according to the first embodiment of the present disclosure.

The full range of the setting item list D2 cannot be displayed at the scrolling display area d10 at one time because the size of the display section 70 is limited. As illustrated in FIG. 4, because of this reason, the display control section 103 causes the display section 70 to display, in the scrolling display area d10, a part of the range of the setting item list D2 (display range shown in the drawing) as a display screen, and when the gesture receiving section 102 receives a scroll gesture from the user, the display control section 103 causes the display section 70 to scroll display the display screen displayed on the scrolling display area d10. For example, when the gesture receiving section 102 receives a scroll gesture to move the screen downward from the user, the display range of the setting item list D2 is changed into the state illustrated in FIG. 5.

When the gesture receiving section 102 receives a selection gesture performed on one setting item out of the setting items displayed on the scrolling display area d10, the setting candidate receiving section 104 changes the setting candidate of the selected one setting item. For example, when the gesture receiving section 102 receives the selection gesture (press-down gesture) on the image d18 indicating the setting item "PAPER SELECTION", the setting candidate receiving section 104 changes the setting candidate of the setting item "PAPER SELECTION". Specifically, every time the gesture receiving section 102 receives the selection gesture performed on the image d18, the setting candidate receiving section 104 changes the setting candidate one by one from "CASSETTE 1" to "CASSETTE 2" to "CASSETTE 3" then to "CASSETTE 1". When the change is made on the setting candidate, the setting candidate receiving section 104 causes the HDD 50 to store the changed setting candidate.

As described thus far, the user inputs a scroll gesture in a vertical direction through the operating key section 71 and the touch panel disposed in front of the display section 70. This input allows a desired setting item out of the plurality of setting items settable in executing the copy processing to be displayed on the scrolling display area d10, and the user can change the setting candidate of the setting item.

Referring back to FIG. 3, in addition to the aforementioned scrolling display area d10, the setting screen D1 includes a scrolling bar d30 used for the scroll gesture, and a preview imaging area d40 on which a preview image showing an image to be formed on the recording sheet. In addition, buttons dl to d6 used for changing the display range of the setting item list D2 to a predetermined range associated with each of the buttons are also arranged on the setting screen D1. For example, when the gesture receiving section 102 receives the selection gesture performed on the button d4 arranged on the setting screen D1, the display control section 103 changes the display range of the setting item list D2 to the range covering the setting item "COLOR" and the setting item "IMAGE QUALITY".

Additionally, shortcut buttons d31 and d32 are arranged on the setting screen D1. Each of the shortcut buttons d31 and d32 is associated with a predetermined setting candidate of a predetermined setting item among the plurality of setting items listed in the setting item list D2. When the gesture receiving section 102 receives the selection gesture performed on the shortcut buttons d31 and d32, the setting candidate receiving section 104 performs a processing of changing the setting candidate of the setting item associated with the selected shortcut button to the aforesaid predetermined setting candidate.

Figure 6:
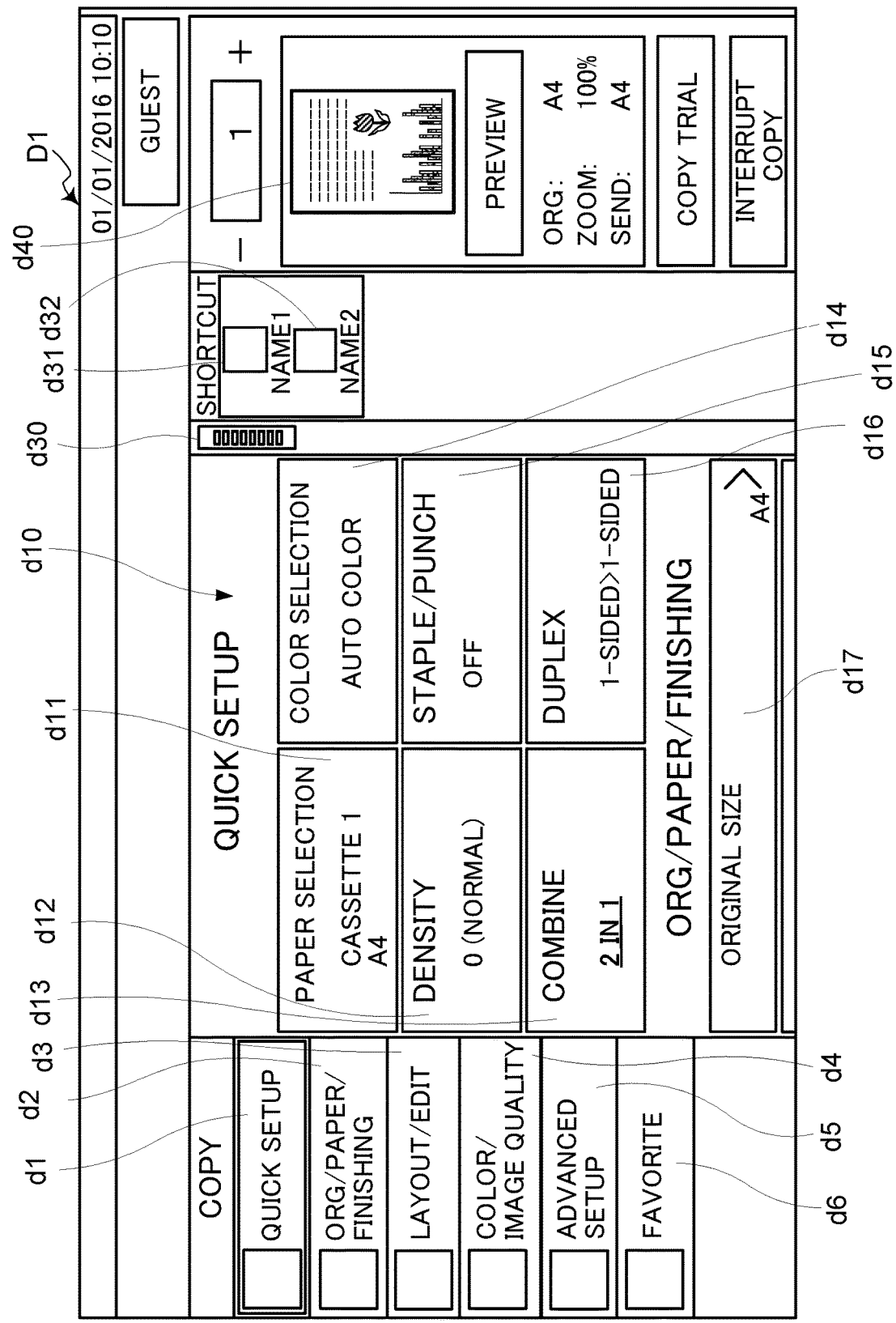
FIG. 6 is a diagram showing an example of the screen displayed on the display section of the image forming apparatus according to the first embodiment of the present disclosure.

In the case where the change in the setting candidate is made through the shortcut buttons d31 and d32, a general image forming apparatus notifies a user that the setting candidate has been changed by the way in which the setting screen D1 is changed from a state illustrated in FIG. 3 to a state illustrated in FIG. 6. In the examples illustrated in the drawings, the setting candidate of the setting item "COMBINE" is changed from "OFF" to "2 IN 1". In the state illustrated in FIG. 6, the setting candidate of "2 IN 1" is displayed on the display section 70 in a display manner different from the setting candidate of "OFF" which is before the change is made (illustrated in FIG. 3). Here, the above-referred "display in a display manner different from" means, for example, changing the thickness and color of characters and displaying.

However, in the display method of the general image forming apparatus, the user cannot know where in the setting item list D2 that the setting candidate of the setting item having been changed through the pressing down operation on the shortcut buttons d31 and d32 is located. Hence, in the case where the user changes, later on, the setting candidate of the setting item by scroll-displaying the setting item list D2 without using the shortcut button, while scrolling the setting item list up and down, it is necessary to perform operation to determine where in the setting item list the setting item that the user desires to change is located. This operation takes time and effort in changing the setting candidate.

Figure 7:
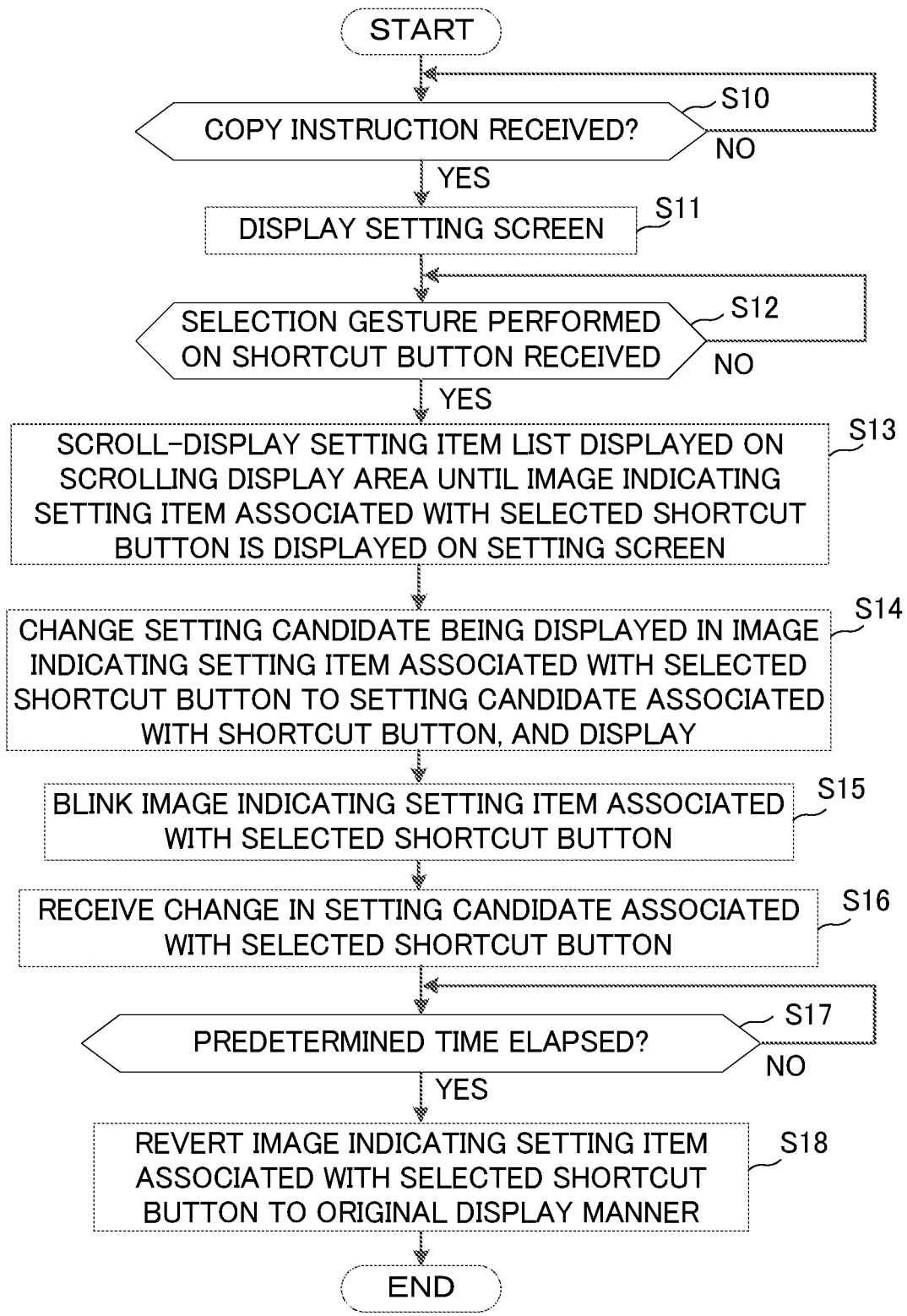
FIG. 7 is a flowchart showing an operation flow of the information processing device and the image forming apparatus according to the first embodiment of the present disclosure.

The present disclosure is to solve the problem described above by devising display methods of the setting screen D1. FIG. 7 is a flowchart showing an operation flow of the information processing device 3 and the image forming apparatus according to the first embodiment of the present disclosure. FIG. 7 illustrates the operation flow in changing the setting candidate of the setting item for the copy processing.

When a copy instruction is inputted through the operating key section 71 or the touch panel disposed in front of the display section 70, and the gesture receiving section 102 receives the copy instruction (YES in step S10), the display control section 103 causes the display section 70 to display the setting screen D1 illustrated in FIG. 3 (step S11).

Figure 8B:
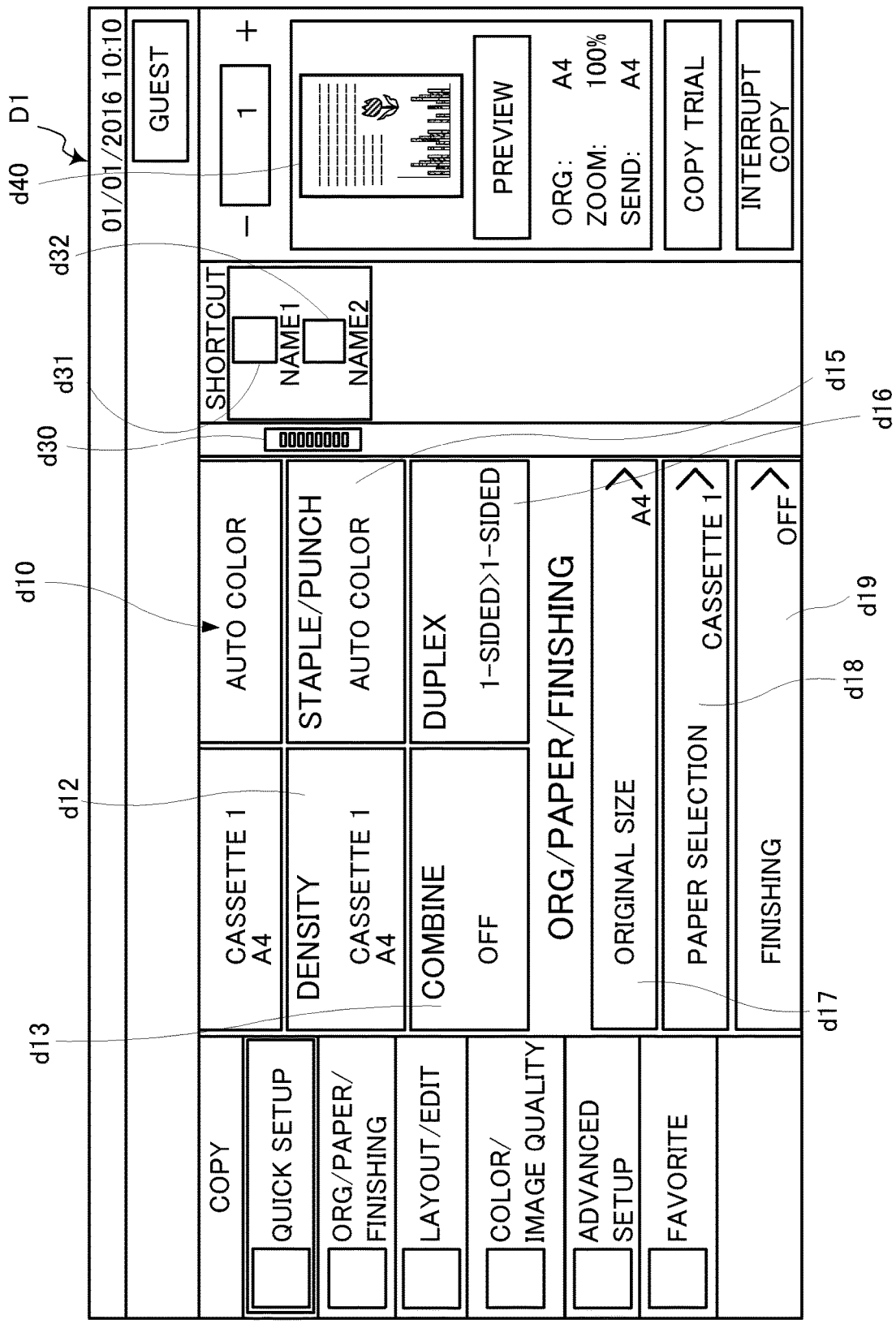
Figure 9A:
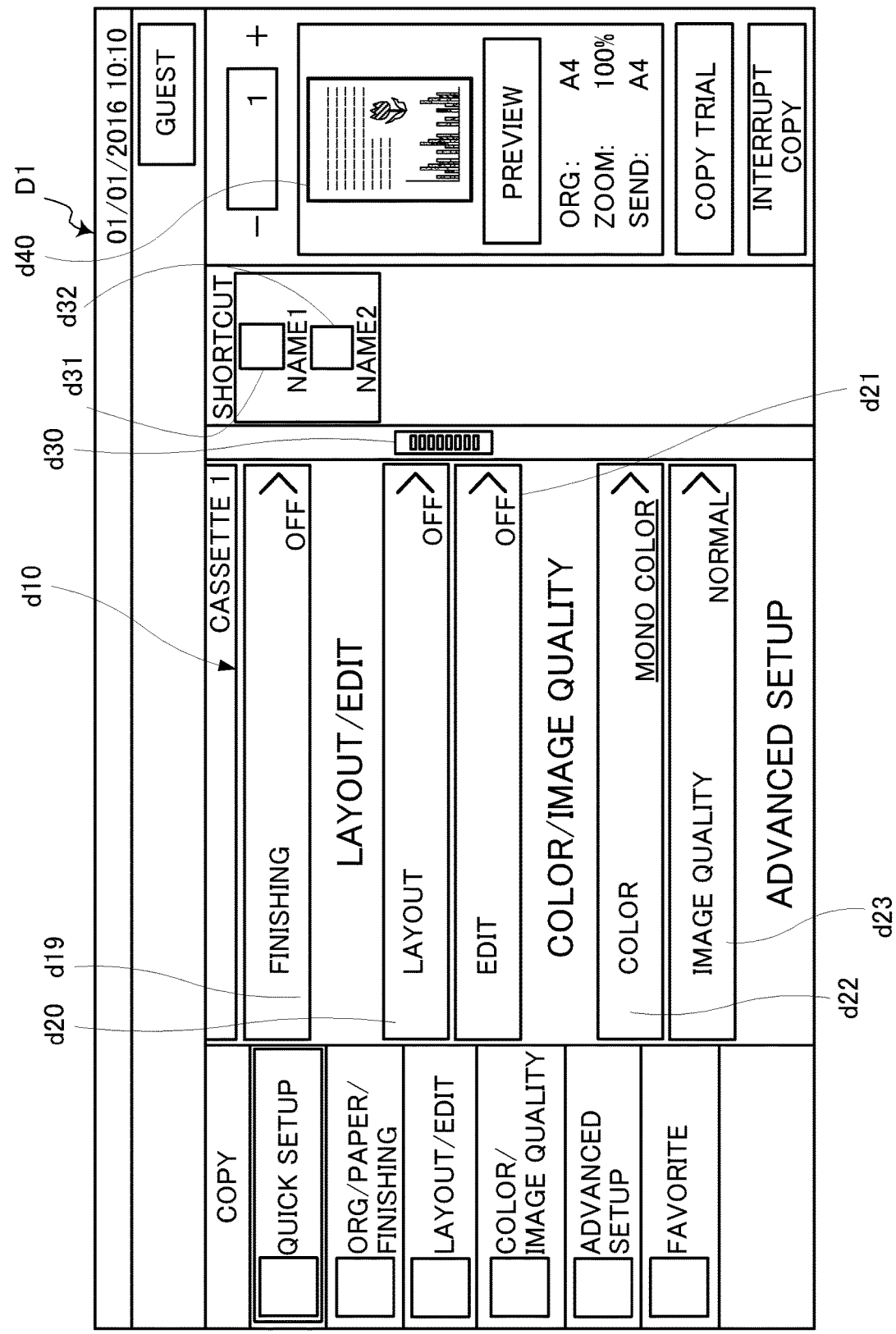
FIG. 9A and FIG. 9B are diagrams each showing an example of the screen displayed on the display section of the image forming apparatus according to the first embodiment of the present disclosure.

When the gesture receiving section 102 receives a selection gesture performed on the shortcut button d31 or d32 on the setting screen D1 (YES in step S12), the display control section 103 causes the display section 70 to scroll-display the setting item list D2 displayed on the scrolling display area d10 until the image indicating the setting item associated with the selected shortcut button is displayed on the setting screen D1 (step S13). With the processing in step S13, the state of the setting screen D1 changes from the state illustrated in FIG. 8A to FIG. 8B, then to the state illustrated in FIG. 9A. FIG. 8A, FIG. 8B and FIG. 9A illustrate the case where the shortcut button d31 associated with the setting item "COLOR" and the setting candidate "MONO COLOR" is selected, and where the setting item list D2 is scroll-displayed until the image d22 indicating the setting item "COLOR" is displayed on the setting screen D1.

With the processing in step S13, after the image indicating the setting item associated with the selected shortcut button is displayed on the setting screen D1, the display control section 103 performs the processing of changing the setting candidate being displayed in the image indicating the setting item associated with the selected shortcut button to the setting candidate associated with the shortcut button (step S14). In the example illustrated in FIG. 9A, the setting candidate indicated in the image d22 indicating the setting item "COLOR" is changed from "AUTO COLOR" to the setting candidate "MONO COLOR" associated with the shortcut button d31.

In the case where the setting candidate in the image indicating the setting item is changed in the processing in step S14, the display control section 103 causes the display section 70 to display the changed setting candidate in the display manner different from other setting candidates in the setting item list D2. To be specific, by changing the thickness of the character and the character color, the display control section 103 changes the display manner of the changed setting candidate so as to be different from other setting candidates.

Figure 9B:
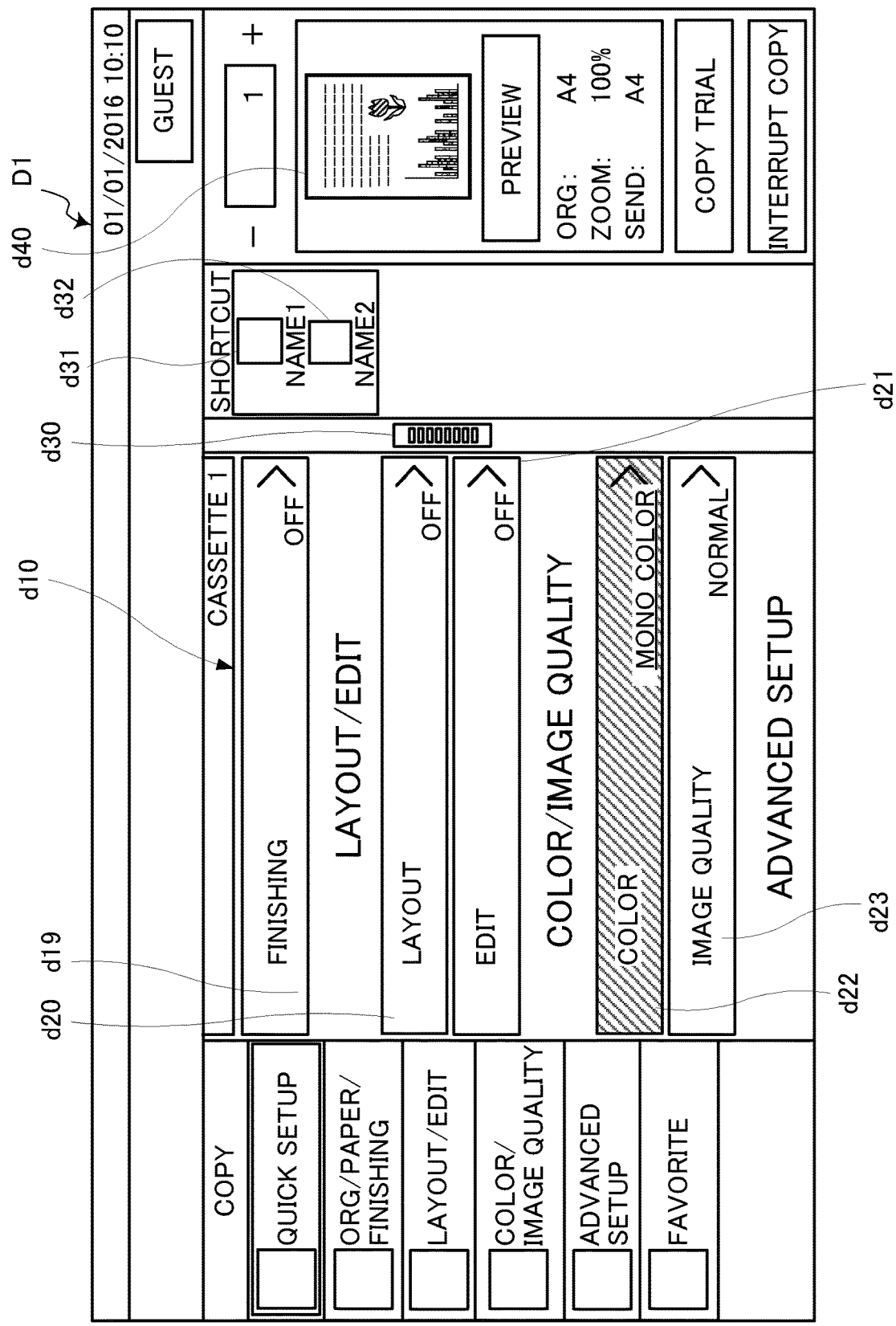
Figure 10:
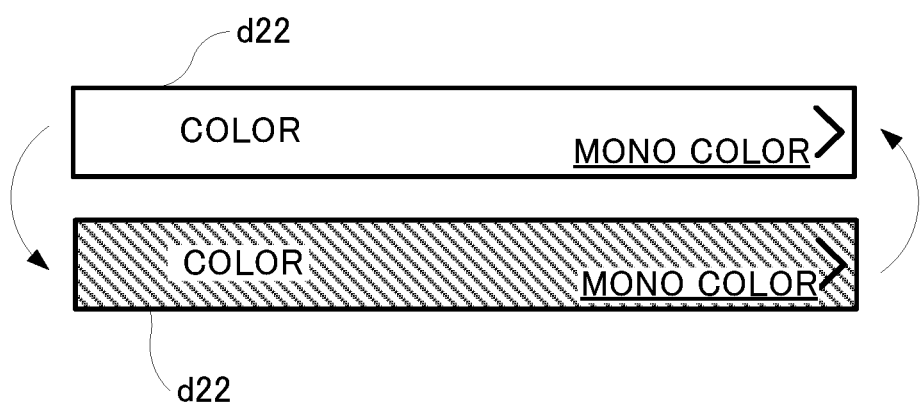
FIG. 10 is a diagram showing a blinking state of an image displayed on the display section of the image forming apparatus according to the first embodiment of the present disclosure.

Additionally, together with the processing in step S14, by blinking the image indicating the setting item associated with the selected shortcut button, the display control section 103 performs the processing of changing the display manner of the image so as to be different from other images in the setting item list D2 (step S15). To be specific, the display control section 103 blinks the image by changing at least one color information among an RGB value, hue, color saturation and lightness of the image indicating the setting item associated with the selected shortcut button. With the processing in step S15, the setting screen D1 becomes the state illustrated in FIG. 9B from the state illustrated in FIG. 9A, and also, as illustrated in FIG. 10, the image d22 indicating the setting item "COLOR" blinks.

The setting candidate receiving section 104 performs the processing of receiving the change in the setting candidate associated with the shortcut button having been selected in the processing in step S12 (step S16). Then, the setting candidate receiving section 104 causes the HDD 50 to store the changed setting candidate.

The processing in step S15 is executed by the display control section 103 during a predetermined time. When the predetermined time elapses after the execution of the processing in step S15 (YES in step S17), that is, when the predetermined time elapses after the image indicating the setting item was began to blink, the display control section 103 stops blinking the image and performs the processing for reverting the display manner of the image to be the same as other images in the setting item list D2 (step S18).

As described above, because a display section has a limit in size in a general device including a plurality of setting items, sometimes a setting item list composed of the plurality of listed setting items cannot be displayed entirely at once. In such case, only a part of the setting item list is firstly displayed, and by scroll-displaying the setting item list upon receiving a scroll gesture from a user, the setting item list can be viewed entirely by the user.

Furthermore, in some cases, the setting screen is provided with a shortcut button associated with a predetermined setting candidate of a predetermined setting item. When the shortcut button is pressed, a general device performs a processing of changing a setting candidate of a setting item into a setting candidate associated with the shortcut button.

However, in the processing described above, the user cannot know the location in the setting item list about the setting candidate of the setting item that has been changed by pressing down the shortcut button. Hence, in the case where the user changes, later on, the setting candidate of the setting item by scroll-displaying the setting item list without using the shortcut button, while scrolling the setting item list up and down, it is necessary to perform operation to determine where in the setting item list the setting item that the user desires to change is located. This operation takes time and effort in changing the setting candidate.

In contrast, even in the case of changing the setting candidate of the setting item through the pressing the shortcut button, the above-described information processing device, image forming apparatus, and information processing program according to the present embodiment can notify the user of where in the setting item list D2 the setting item having been changed through the pressing the shortcut button is located.

The present disclosure is not limited to the configuration of the above embodiment and can be modified in various ways.

Modification 1

Descriptions have been given in the above embodiment for the case where, by being blinked, the image indicating the setting item associated with the shortcut button that the gesture receiving section 102 has received the selection gesture made thereon is displayed in the display manner different from other images in the setting item list D2. However, the present disclosure is not necessarily limited to the case. For example, the display control section 103 may enlarge a size of the image indicating the setting item associated with the selected shortcut button so that the display manner thereof becomes different from other images in the setting item list D2.

Furthermore, the display control section 103 may blink periphery of the image indicating the setting item associated with the selected shortcut button, not the entire image, so that the display manner thereof becomes different from other images in the setting item list D2.

Modification 2

Figure 11:
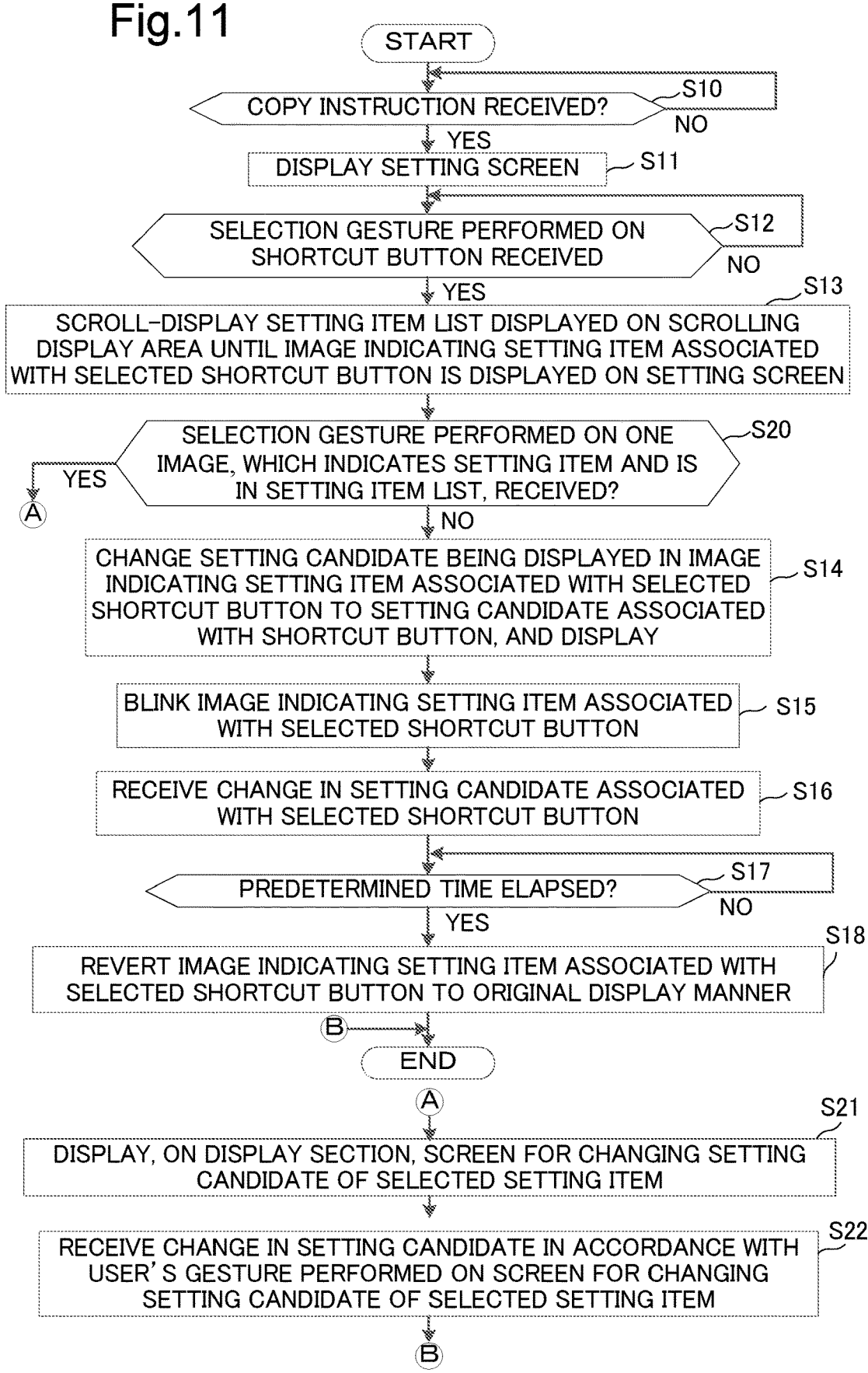
FIG. 11 is a flowchart showing an operation flow of an information processing device and an image forming apparatus according to a modified example of the present disclosure.

FIG. 11 is a flowchart showing an operation flow of an information processing device and an image forming apparatus according to modification 2. The same pieces of processing as those in the flowchart of FIG. 7 are designated by the same reference numbers and further explanation thereof will be omitted.

During the processing in step S13, in other words, while the setting item list D2 is being scroll-displayed, in the case where the gesture receiving section 102 receives the selection gesture performed on one image among the plurality of images indicating the setting item in the setting item list (YES in step S20), the display control section 103 causes the display section 70 to display the screen for changing the setting candidate of the setting item indicated in the selected one image (step S21). For example, in the case where the selection gesture is performed on the image d18 under the state illustrated in FIG. 8B, the display control section 103 causes the display section 70 to display the screen for changing the setting candidate of the setting item "PAPER SELECTION". Then, the setting candidate receiving section 104 receives, in accordance with the user's gesture performed on the screen displayed through the processing in step S21, the change in the setting candidate (step S22).

By performing the processing described above, the user can change the setting candidate of the setting item other than the setting item associated with the shortcut button after performing the gesture for selecting the shortcut button.

Modification 3

In the case where the gesture receiving section 102 receives the selection gesture performed on the shortcut button, when the selection gesture is the selection gesture of the predetermined kind, the display control section 103 may perform the processing in step S13, step S14, and step S15, and when the selection gesture is the selection gesture other than the predetermined kind, the display control section 103 may perform the processing in step S14, but may not perform the processing in step S13 and step S15.

Examples of the aforementioned selection gesture of the predetermined kind are a long touch gesture, which is the touching gesture longer than a predetermined time, and a double touch gesture, which means two consecutive selection gestures. In the case where the shortcut button is selected through the long touch gesture or the double touch gesture, the display control section 103 performs the processing in step S13, step S14, and step S15. In contrast, in the case where the shortcut button is selected through the normal touch gesture, the display control section 103 performs the processing in step S14, but does not perform the processing in step S13 and step S15. In other words, the display control section 103 only performs the processing of changing the setting candidate shown in the image indicating the setting item to the setting candidate associated with the shortcut button, and the display control section 103 does not perform the scroll-displaying of the setting item list D2 and blinking of the image in the setting item list D2. This processing is similar to the processing in the above-described general image forming apparatus.

As described thus far, in the information processing device, image forming apparatus, and information processing program according to the modification 3, when the user changes the gesture of selecting the shortcut button, the setting screen D1 can be displayed by the desired display processing between the above-described two patterns of display processing.

Modification 4

In the above embodiment and the modification, descriptions have been given for the case where the shortcut button is associated with one predetermined setting item, but the present disclosure is not necessarily limited to the case. The present disclosure can be applied to the case where the shortcut button is associated with a plurality of predetermined setting items.

When the gesture receiving section 102 receives the selection gesture performed on the shortcut button associated with the plurality of predetermined setting items, in the processing in step S13, the display control section 103 causes the display section 70 to scroll-display the setting item list D2 until the image indicating one setting item among the plurality of predetermined setting items is displayed on the setting screen D1.

After the predetermined time elapses from the execution of the above processing, until an image indicating a next setting item out of the plurality of predetermined setting items is displayed in the setting screen D1, the display control section 103 performs the processing of causing the display section 70 to scroll-display the setting item list D2. Then, the display control section 103 repeatedly executes this processing until an image indicating a last setting item out of the plurality of predetermined setting items is displayed in the setting screen D1.

As described above, in the case where the shortcut button is associated with the plurality of predetermined setting items, the information processing device, image forming apparatus, and information processing program according to the modification 4 can notify the user of where in the setting item list D2 the plurality of predetermined setting items is located.

Second Embodiment

Hereinafter, a description will be given, with reference to the drawings, on an information processing device, an image forming apparatus, and information processing program according to a second embodiment of the present disclosure. The configurations of the image forming apparatus 1 in the second embodiment are similar to that of in the first embodiment, and thus the detailed description thereof will not be repeated here.

In the present embodiment, in the case where the gesture receiving section 102 receives the selection gesture performed on one image among the plurality of images indicating the setting item in the setting item list, the display control section 103 may cause the display section 70 to change the screen to be display from the setting screen D1 to the detail screen for changing the setting candidate of the setting item indicated in the selected one image. The setting candidate receiving section 104 receives the change in the setting candidate in accordance with the use's gesture performed on the detail screen.

Figure 12:
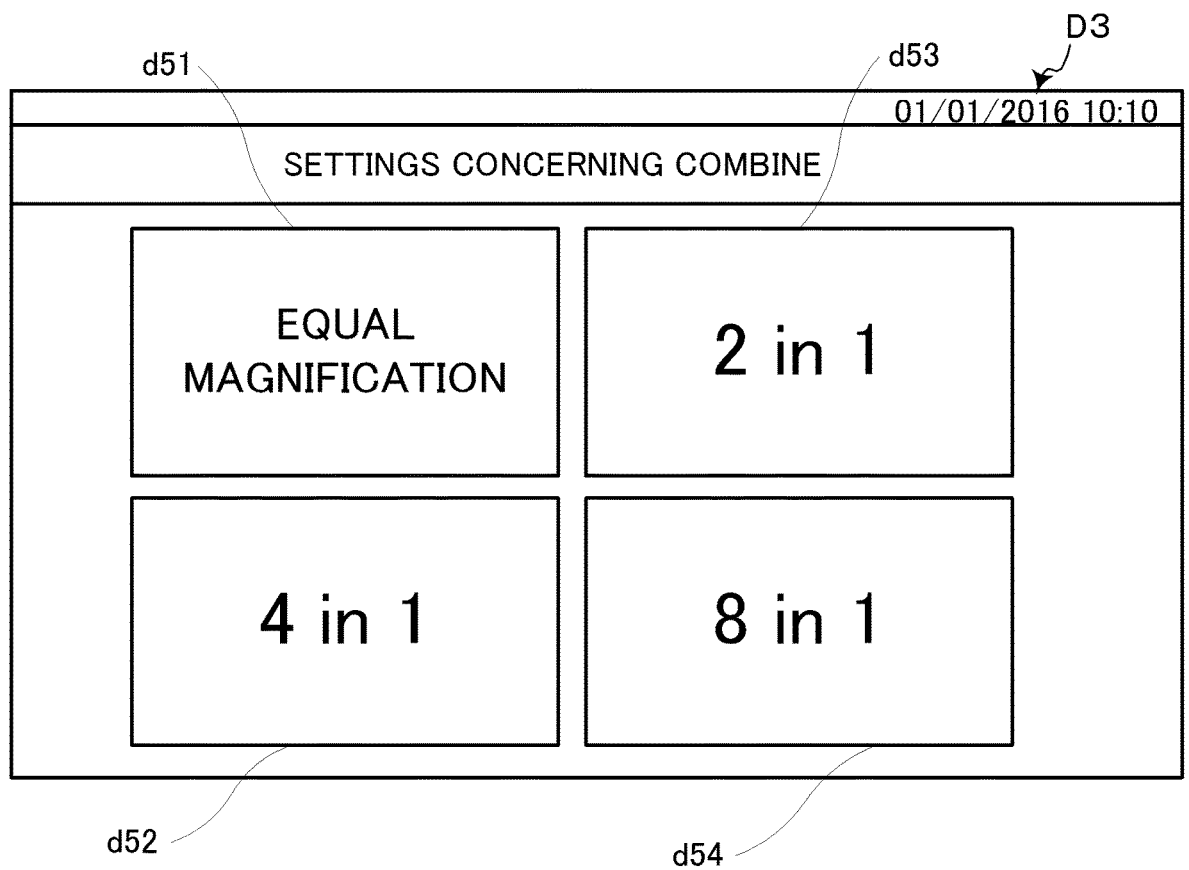
FIG. 12 is a diagram showing an example of a detail screen displayed on a display section of an image forming apparatus according to a second embodiment of the present disclosure.

FIG. 12 is a diagram showing an example of the detail screen. A detail screen D3 illustrated in FIG. 12 is the screen to be displayed when an image d13 indicating the setting item "COMBINE" in the setting item list D2 is selected. A plurality of buttons d51 to d54 is arranged on the detail screen D3. Each of the buttons d51 to d54 is associated with settable setting candidate. For example, in the case where the gesture receiving section 102 receives the selection gesture performed on the button d53, the setting candidate receiving section 104 changes the setting candidate of the setting item "COMBINE" to the setting candidate "2 IN 1" associated with the selected button d53.

In the display method of the general image forming apparatus, the user cannot know at which position in the setting item list D2 the setting candidate of the setting item that has been changed by pressing the shortcut buttons d31 and d32 is located. Hence, in the case where the user changes the setting candidate of the setting item later on without using the shortcut button, it is necessary to perform the operation of finding where in the setting item list the setting item to be changed is located. This operation takes time and effort to change the setting candidate.

Figure 13:
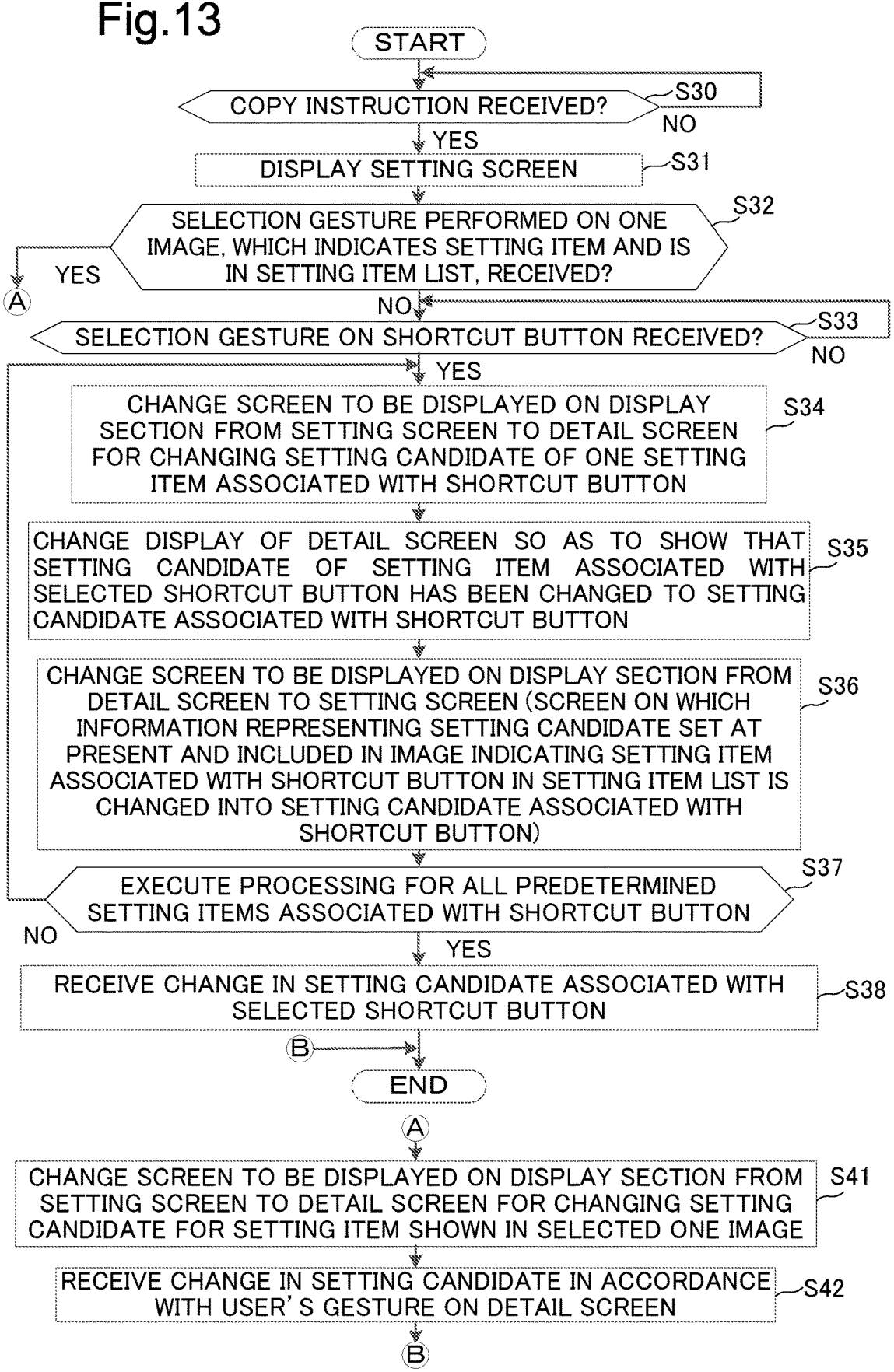
FIG. 13 is a flowchart showing an operation flow of an information processing device and the image forming apparatus according to the second embodiment of the present disclosure.

The present disclosure solves the problem mentioned above by devising the method of displaying the setting screen D1. FIG. 13 is a flowchart showing an operation flow of the information processing device and the image forming apparatus according to the second embodiment of the present disclosure. FIG. 13 illustrates the operation flow in changing the setting candidate of the setting item for the copy processing.

When a copy instruction is inputted through the operating key section 71 and the touch panel disposed in front of the display section 70, and the gesture receiving section 102 receives the copy instruction (YES in step S30), the display control section 103 causes the display section 70 to display the setting screen D1 illustrated in FIG. 3 (step S31).

On the setting screen D1, when the gesture receiving section 102 receives the selection gesture performed on one image indicating the setting item in the setting item list D2 (YES in step S32), the display control section 103 causes the display section 70 to change the screen to be displayed thereon from the setting screen D1 to the detail screen D3 (see FIG. 12) which is for changing the setting candidate of the setting item shown in the one image selected in the processing in step S32 (step S41). Then, the setting candidate receiving section 104 receives, in accordance with the user's gesture performed on the detail screen D3 having been displayed in the processing in step S41, the change in the setting candidate (step S42).

Also on the setting screen D1, when the gesture receiving section 102 receives the selection gesture performed on the shortcut button d31 or d32, (YES in step S33), the display control section 103 causes the display section 70 to display the screen to be displayed thereon from the setting screen D1 to the detail screen D3 which is for changing the setting candidate of the one setting item associated with the shortcut button selected in the processing in step S33 (step S34).

After the processing in step S34, the display control section 103 changes the detail screen D3 displayed in the processing in step S34 so as to show that the setting candidate of the setting item associated with the selected shortcut button has been changed to the setting candidate associated with the shortcut button (step S35).

After the processing in step S35, the display control section 103 causes the display section 70 to change the screen from the detail screen D3 to the setting screen D1 (step S36). On the processing, the display control section 103 causes the display section 70 to display the setting screen D1, on which the information representing the setting candidate set at present and included in the image indicating the setting item associated with the shortcut button in the setting item list D2 is changed into the setting candidate associated with the shortcut button.

the display control section 103 executes, for all the setting items associated with the shortcut button selected in the processing of step S33, the processing in step S34 to step S36 (step S37). In other words, in the case where the shortcut button is associated with the plurality of predetermined setting items, when the gesture receiving section 102 receives the selection gesture performed on the shortcut button, the display control section 103 executes the processing in step S34, step S35, and step S36, in turn, for each of the setting items out of the plurality of predetermined setting items associated with the shortcut button.

The display control section 103 performs, in high speed, the display switching between the setting screen D1 and the detail screen D3 performed in step S34, step S35, and step S36. To be specific, the display control section 103 executes, during the predetermined time, the processing in step S34, step S35, and step S36.

After the processing in step S37, the setting candidate receiving section 104 performs the processing of receiving the change in the setting candidate associated with the shortcut button having been selected in step S33 (step S38). Then, the setting candidate receiving section 104 causes the HDD 50 to store the changed setting candidate.

The above-described processing in step S34 to step S37 will be detailed with reference to FIG. 14A to FIG. 16B. These drawings illustrate transitions of the display screen in the case where the shortcut button d31 associated with the following is selected: (1) with the setting item "COMBINE" and the setting candidate "2 IN 1"; and (2) with the setting item "PAPER SELECTION" and the setting candidate "CASSETTE 3".

In the case where the gesture receiving section 102 receives the selection gesture performed on the shortcut button d31, under the control of the display control section 103, the display screen that the display section 70 displays shifts from the setting screen D1 illustrated in FIG. 3 to the detail screen D3 (see FIG. 14A) which is to set the setting item "COMBINE" which is one of the plurality of setting items associated with the selected shortcut button d31.

Figure 14A:
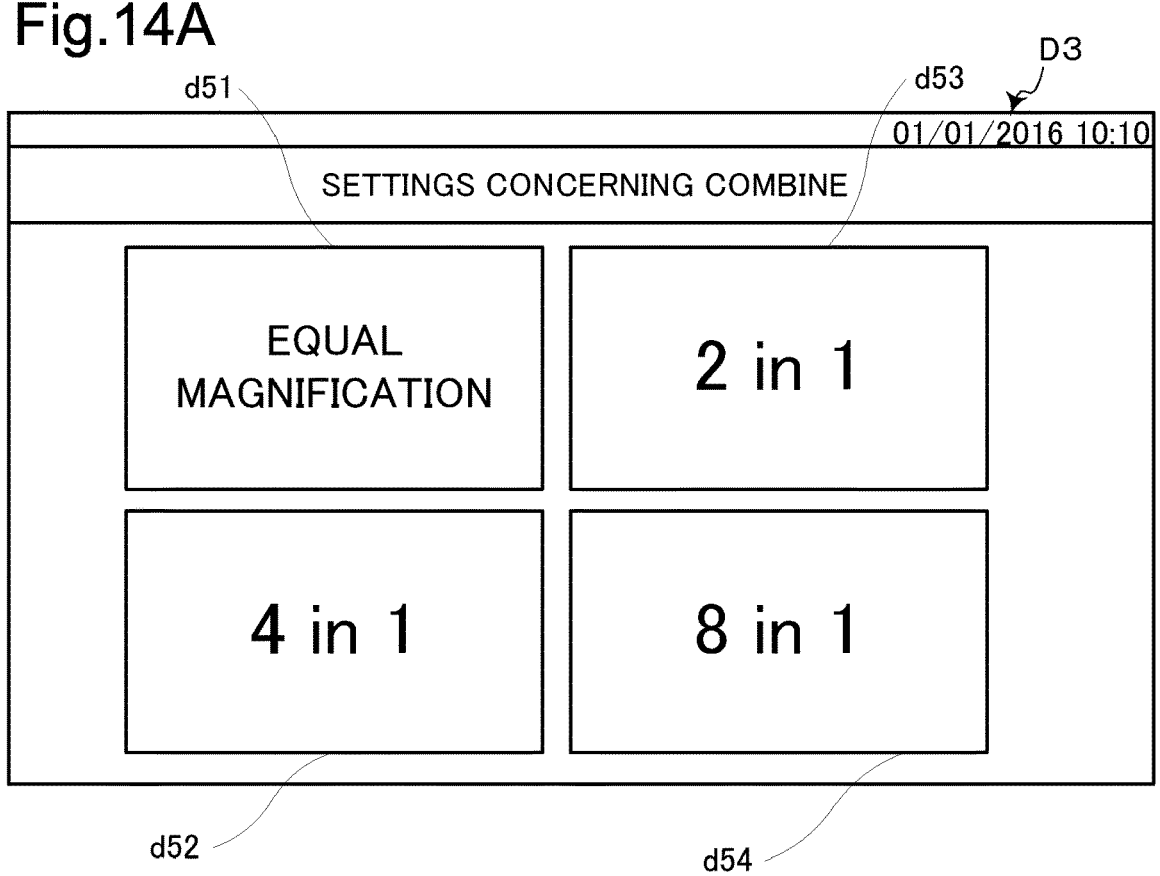
FIG. 14A and FIG. 14B are diagrams each showing an example of the screen displayed on the display section of the image forming apparatus according to the second embodiment of the present disclosure.
Figure 14B:
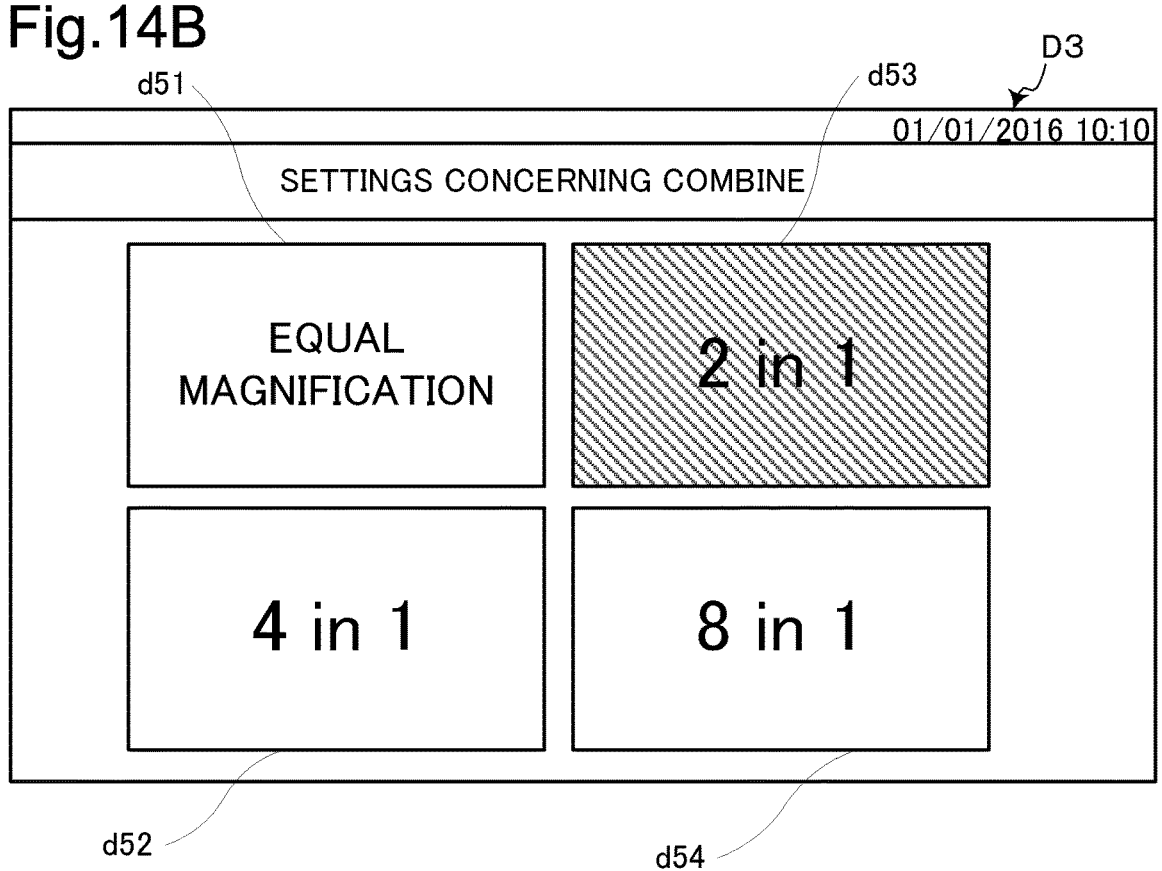

The detail screen D3 illustrated in FIG. 14A shifts to the state illustrated in FIG. 14B showing that the setting candidate of the setting item "COMBINE" has been changed to the setting candidate "2 IN 1" associated with the selected short cut button d31.

Figure 15A:
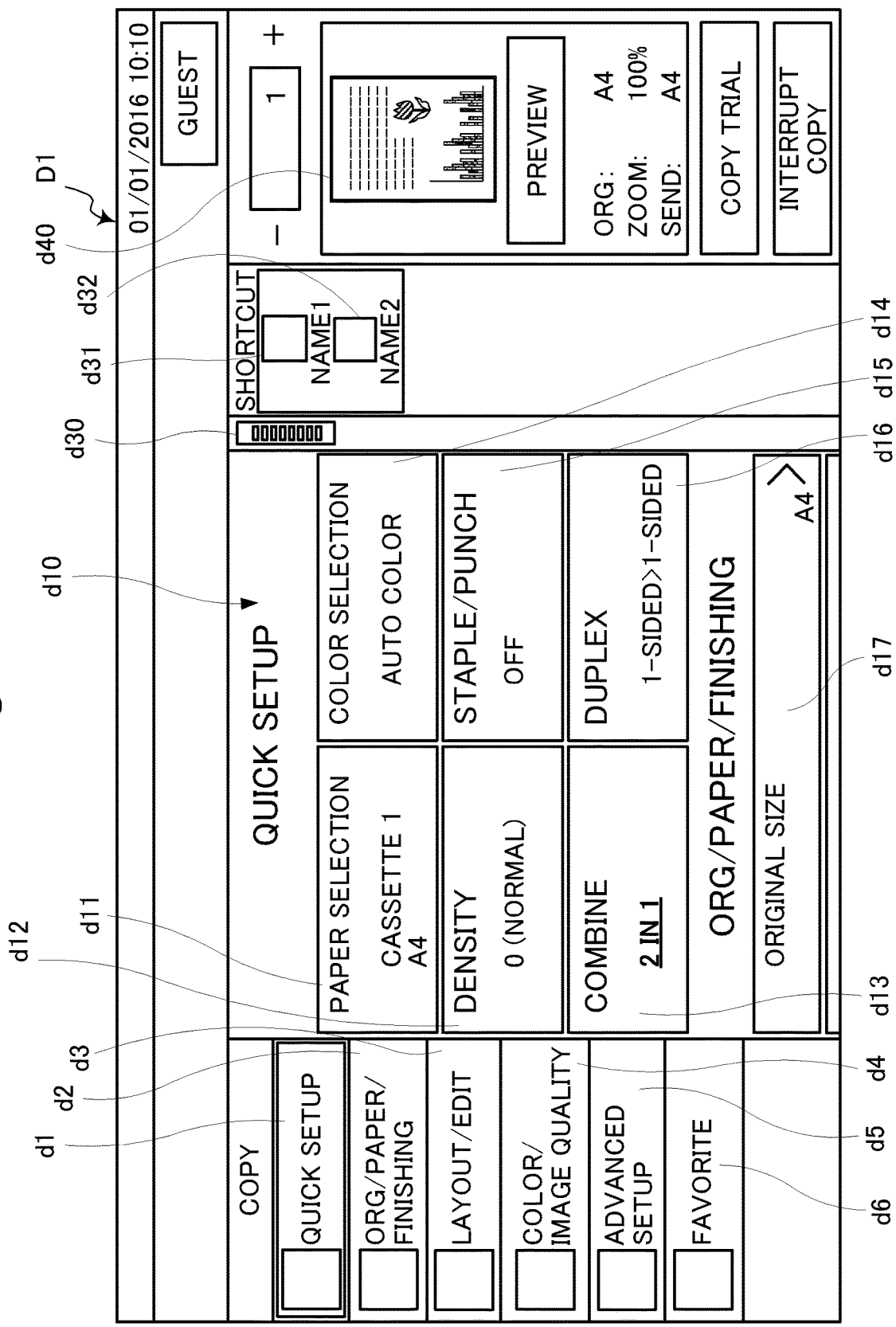
FIG. 15A and FIG. 15B are diagrams each showing an example of the screen displayed on the display section of the image forming apparatus according to the second embodiment of the present disclosure.
Figure 15B:
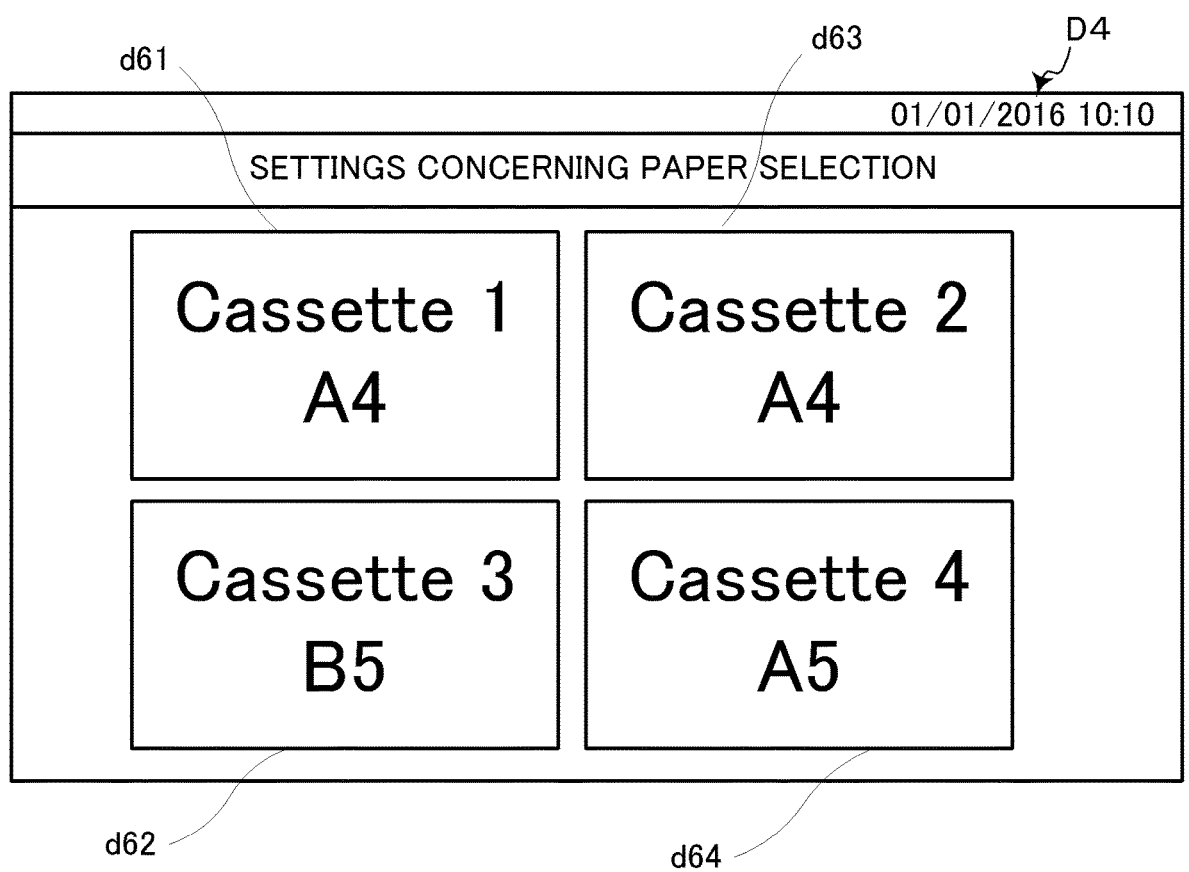
Figure 16A:
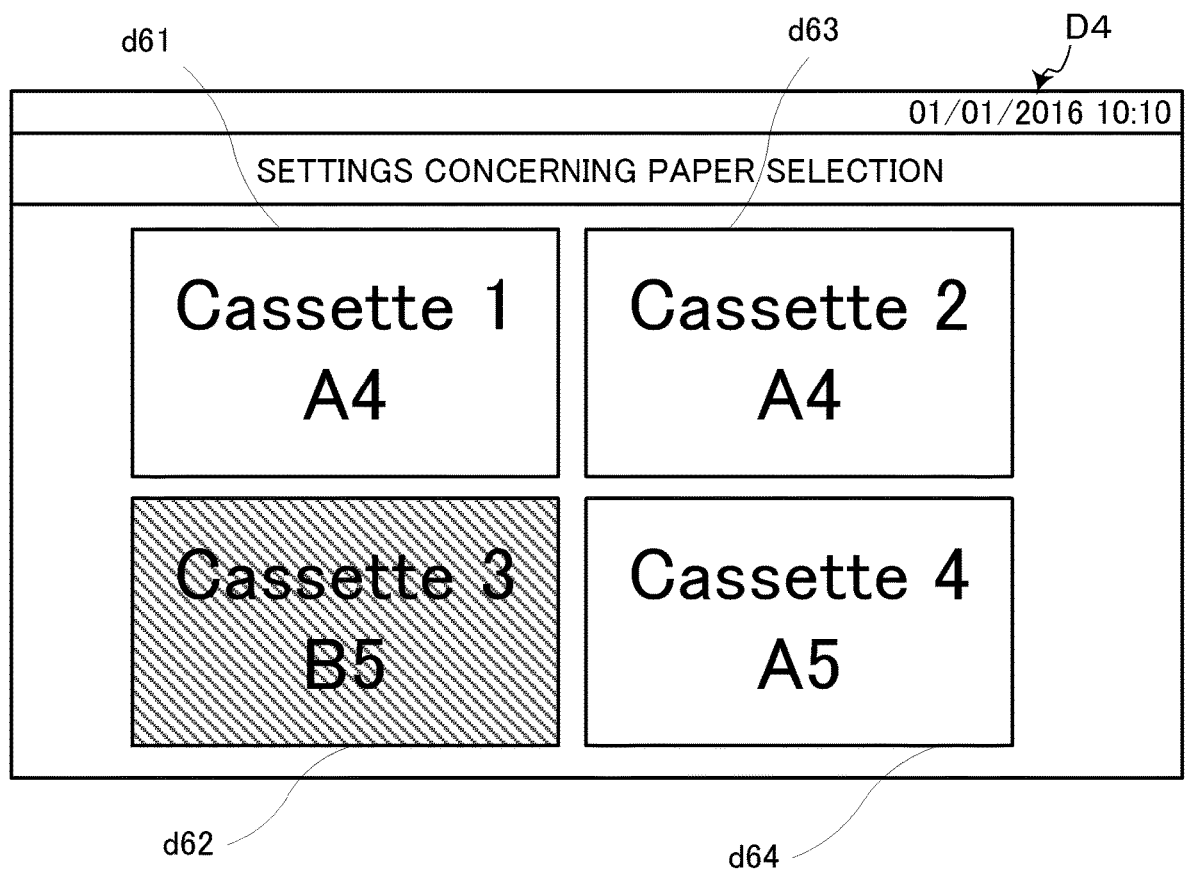
FIG. 16A and FIG. 16B are diagrams each showing an example of the screen displayed on the display section of the image forming apparatus according to the second embodiment of the present disclosure.
Figure 16B:
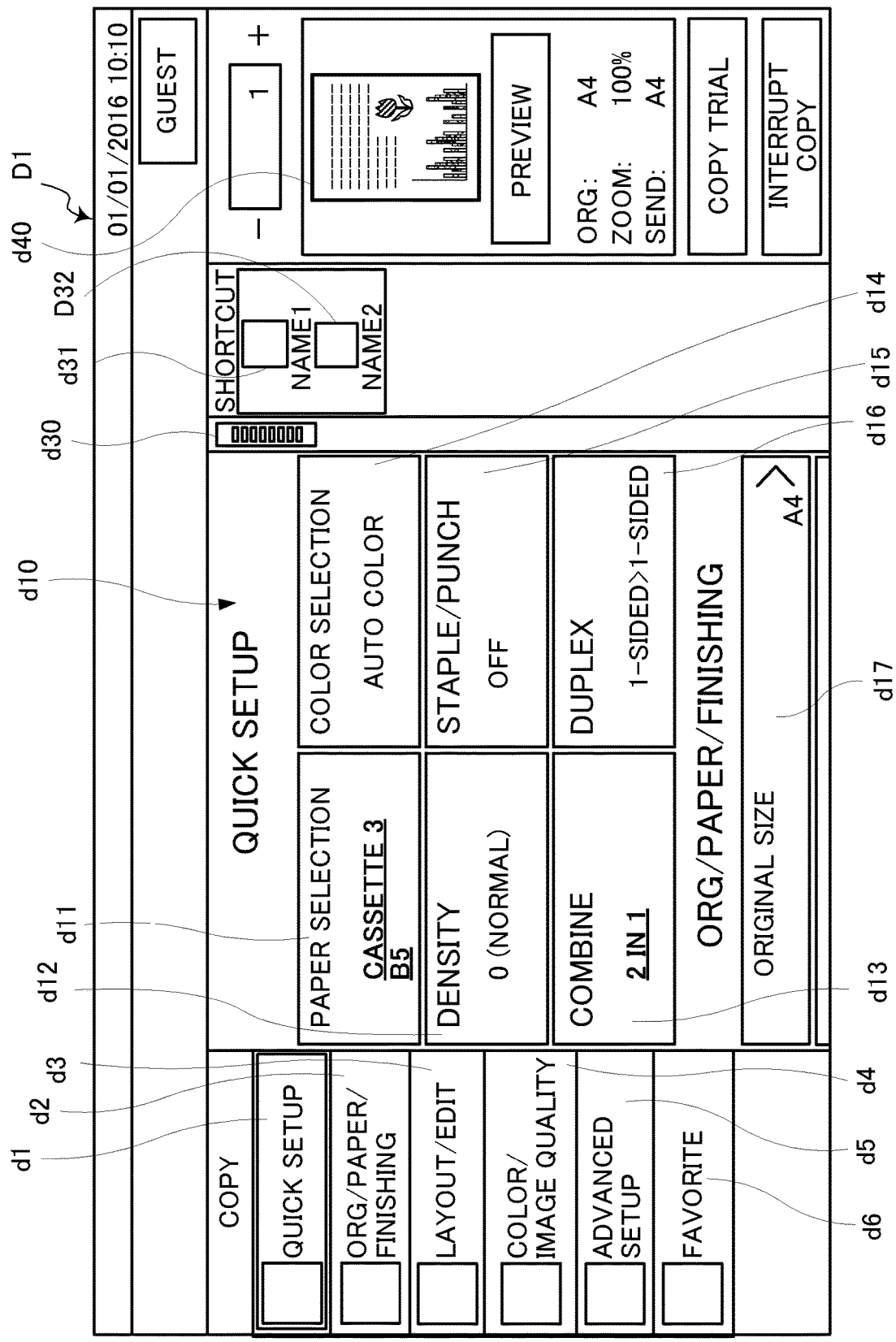

Then, under the control of the display control section 103, the display screen that the display section 70 displays shifts from the detail screen D3 illustrated in 14B to the setting screen D1 illustrated in FIG. 15A. On the setting screen D1 illustrated in FIG. 15A, the information representing the setting candidate set at present and included in the image d12 indicating the setting item "COMBINE" associated with the shortcut button d31 in the setting item list D2 is changed to the setting candidate "2 IN 1" associated with the shortcut button d31. In addition, the changed setting candidate is displayed on the display section 70 in the display manner different from other setting candidates in the setting item list D2. To be specific, under the control by the display control section 103, the changed setting candidate is displayed in the display manner different from other setting candidates by the thickness of the characters and character color are being changed.

After displaying the screen illustrated in FIG. 15A, the processing similar to the aforesaid display processing is performed on the setting item "PAPER SELECTION", which is the other one setting item among plurality of setting items associated with the selected shortcut button d31. Thus, the display screen that the display section 70 displays shifts from the sate illustrated in FIG. 15A to the state illustrated in FIG. 15B, then to FIG. 16A, then to FIG. 16B. Here, in FIG. 15B and FIG. 16A, the detail screen D4 is the screen displayed when the image d11 indicating the setting item "PAPER SELECTION" in the setting item list D2 is selected. A plurality of buttons d61 to d64 is arranged on the detail screen D4. Each of the buttons d61 to d64 is associated with settable setting candidate. For example, in the case where the gesture receiving section 102 receives the selection gesture performed on the button d62, the setting candidate receiving section 104 changes the setting candidate of the setting item "PAPER SELECTION" to the setting candidate "CASSETTE 3 B5" being associated with the selected button d62.

As described above, in the general devices having the plurality of setting items, the shortcut button associated with the predetermined setting candidate of the predetermined setting item is arranged on the setting screen in some cases. When such the shortcut button is pressed, the general devices perform the processing of changing the setting candidate of the setting item to the setting candidate associated with the shortcut button.

In the processing described above, the user cannot know at which position in the setting item list the setting candidate of the setting item that has been changed by pressing the shortcut button is located. Hence, in the case where the user changes a setting candidate of a setting item later on without using the shortcut button, it is necessary to perform the operation of finding where in the setting item list the setting item to be changed is located. This operation takes time and effort to change the setting candidate.

In contrast, by performing the aforementioned display operation when the shortcut button is selected, the above-described information processing device, image forming apparatus, and information processing program according to the present embodiment can notify the user of where in the setting item list the setting item, which has been changed by the selection of the shortcut button, is located. Accordingly, in the case where the user changes the setting candidate of the setting item later on without using the shortcut button, the user can perform the change without identifying where the setting item to be changed is located in the setting item list.

The present disclosure is not limited to the configuration of the above embodiment and can be modified in various ways.

Modification 1 in the case where the gesture receiving section 102 receives the selection gesture performed on the setting screen or the detail screen during the processing in step S34 to step S37, the display control section 103 may stop the switching of the screen between the setting screen and the detail screen being performed in the processing in step S34 to step S37.

By performing the processing described above, in the case where the user already knows where in the setting item list the setting candidate having been changed by selecting the shortcut button is located, the user can stop the switching of the screen between the setting screen and the detail screen.

Modification 2

In the case where the gesture receiving section 102 receives the selection gesture performed on the shortcut button, when the selection gesture is the selection gesture of the predetermined kind, the display control section 103 may perform the processing in step S34 to step S37, and when the selection gesture is the selection gesture other than the predetermined kind, the display control section 103 may not perform the processing in step S34 to step S37 but may perform the processing of displaying to show that the information representing the setting value set at present and included in the setting item list is changed into the setting candidate associated with the selected shortcut button.

Examples of the aforementioned selection gesture of the predetermined kind are a long touch gesture, which is the touching gesture longer than a predetermined time, and a double touch gesture, which means two consecutive selection gestures. In the case where the shortcut button is selected through the long touch gesture or the double touch gesture, the display control section 103 performs the processing in step S33, step S34, and step S35. In contrast, in the case where the shortcut button is selected through the normal touch gesture, the display control section 103 does not perform the processing in step S34 to step S37, but performs the processing of displaying to show that the information representing the setting value set at present and included in the setting item list is changed into the setting candidate associated with the selected shortcut button. With the control performed by the display control section 103, the display screen displayed on the display section 70 shifts to the setting screen illustrated in FIG. 16B from the setting screen D1 illustrated in FIG. 3, without having to transition to the screens illustrated in FIG. 14a to FIG. 16a.

As described thus far, in the information processing device, image forming apparatus, and information processing program according to the modification 2, when the user changes the gesture of selecting the shortcut button, the display screen that the display section 70 displays can be displayed by the desired display processing between the above-described two patterns of display processing.

OTHER MODIFICATION

The information processing program detailed in the above embodiment may be stored in a computer-readable non-transitory recording medium such as a hard disc, a CD-ROM, a DVD-ROM, and a semiconductor memory.

Although in the above embodiment the image forming apparatus has been taken as an example of the device on which the information processing device according to the present embodiment is provided, the present disclosure is not necessarily limited to the case. The information processing device applicable as one embodiment of the present disclosure may be, besides the image forming apparatus, for example, a mobile terminal such as a tablet terminal or a smartphone, a personal computer or a television set.

While the present disclosure has been described in detail with reference to the embodiments thereof, it would be apparent to those skilled in the art the various changes and modifications may be made therein within the scope defined by the appended claims.

What is claimed is:

1. An information processing device executing a predetermined function according to setting candidates set for each of a plurality of setting items, the information processing device comprising:
- a display section displaying a setting screen that shows a setting item list including first and second setting items, and that receives first and second changes in first and second setting candidates respectively; and
- a control unit including a processor and, when the processor executes an information processing program, functions as:
  - a display control section controlling display operation of the display section;
  - a gesture receiving section receiving a user's gesture; and
  - a setting candidate receiving section receiving, in accordance with the user's gesture received by the gesture receiving section, the first and second changes,
- wherein the first setting item includes the first setting candidate for a user to set,
- the second setting item includes the second setting candidate for the user to set,
- the setting screen includes a scrolling display area where a predetermined scroll image is scrolled in accordance with a scroll gesture received by the gesture receiving section,
- the display control section causes the display section to display, on the scrolling display area, a part of the setting item list as the predetermined scroll image, and to display, at a position on the setting screen different from the scrolling display area, a shortcut button being arranged to select the first setting item and the first setting candidate when pushed, the setting item list being a list in which first and second images respectively indicating first and second names of the first and second setting items are listed along a scrolling direction, and the setting candidate set at present is shown in each of the images respectively indicating each name of the first and second setting items,
- in the case where the gesture receiving section receives the selection gesture performed on the shortcut button, the display control section causes the display section to:
  - (i) scroll the setting item list being displayed on the scrolling display area until a display range including the first image indicating the first name of the first setting item associated with the selected shortcut button is displayed in the scrolling display area;
  - (ii) change to the first setting candidate associated with the shortcut button; and
  - (iii) display the first image indicating the first name of the first setting item associated with the selected shortcut button in a display manner different from other images in the setting item list, and
- in a case where the gesture receiving section receives a selection gesture performed on the shortcut button, the setting candidate receiving section receives the first change to the first setting candidate associated with the selected shortcut button.

2. The information processing device according to claim 1, wherein
in the processing of (iii), the display control section causes the display section to display the first image indicating the first name of the first setting item associated with the selected shortcut button in the display manner different from other images in the setting item list during a predetermined time, and after the predetermined time elapses, the display control section causes the display section to display the first image indicating the first name of the first setting item associated with the selected shortcut button in a same display manner with the other images.

3. The information processing device according to claim 1, wherein
by changing at least one of color information such as an RGB value, hue, color saturation and lightness of the first image indicating the first name of the first setting item associated with the selected shortcut button and blinking the first image, the display control section changes the display manner of the first image so as to be different from other images in the setting item list.

4. The information processing device according to claim 1, wherein
during the processing of (i), in a case where the gesture receiving section receives a selection gesture performed on one image among the first and second images respectively indicating each name of the first and second setting items in the setting item list, the display control section causes the display section to display a screen for changing a setting candidate of a setting item indicated in the selected one image, and
in accordance with the user's gesture performed on the screen for changing the setting candidate of the setting item indicated in the selected one image, the setting candidate receiving section receives change in the setting candidate.

5. The information processing device according to claim 1, wherein
in the case where the gesture receiving section receives the selection gesture performed on the shortcut button, when the selection gesture is a selection gesture of a predetermined kind, the display control section performs the processing of (i), (ii), and (iii), and when the selection gesture is a selection gesture other than the predetermined kind, the display control section performs the processing of (ii) but does not perform processing of (ii) and (iii).

6. The information processing device according to claim 1, wherein
in a case where the shortcut button is associated with a plurality of first setting items, when the gesture receiving section receives the selection gesture performed on the shortcut button, the display control section causes the display section to scroll-display, in the processing of (i), the setting item list until an image indicating the name of one first setting item among the plurality of first setting items is displayed in the scrolling display area, and then, after a predetermined time elapses, the display control section repeatedly executes, until an image indicating the name of a last one first setting item among the plurality of first setting items is displayed in the scrolling display area, processing of causing the display section to scroll-display the setting item list until an image indicating the name of a next one first setting item among the plurality of first setting items is displayed in the scrolling display area.

7. The information processing device according to claim 1, wherein
in a case where the gesture receiving section receives a selection gesture performed on one image among the first and second images respectively indicating each name of the first and second setting items in the setting item list, the display control section changes a screen to be displayed on the display section from the setting screen to a detail screen for changing the setting candidate of the setting item indicated in the selected one image.

8. An image forming apparatus comprising:
an image forming section forming an image on a recording sheet; and
the information processing device according to claim 1,
wherein the display section displays a setting screen that receives change in a setting candidate of a plurality of respective setting items related to an image formation by the image forming section,
the setting candidate receiving section receives, in accordance with the user's gesture received by the gesture receiving section, the change in the setting candidate of the respective setting items related to the image formation by the image forming section, and
the image forming section executes image forming operation based on the setting candidate of the setting item that the setting candidate receiving section has received.

9. A computer-readable non-transitory recording medium with an information processing program stored thereon, the information processing program causing a computer including a processor and a display section to function, when the processor executes the information processing program, as:
a display control section controlling display operation of the display section, the display section displaying a setting screen that shows a setting item list including first and second setting items for executing a predetermined function, and that receives first and second changes in first and second setting candidates respectively;
a gesture receiving section receiving a user's gesture; and
a setting candidate receiving section receiving, in accordance with the user's gesture received by the gesture receiving section, the first and second changes,
wherein the information processing program further causes the computer to function so that:
the first setting item includes the first setting candidate for a user to set,
the second setting item includes the second setting candidate for the user to set,
the setting screen includes a scrolling display area where a predetermined scroll image is scrolled in accordance with a scroll gesture received by the gesture receiving section, the display control section causes the display section to display, on the scrolling display area, a part of the setting item list as the predetermined scroll image, and to display, at a position on the setting screen different from the scrolling display area, a shortcut button being arranged to select the first setting item and the first setting candidate when pushed, the setting item list being a list in which first and second images respectively indicating first and second names of the first and second setting items are listed along a scrolling direction, and the setting candidate set at present is shown in each of the images respectively indicating each name of the first and second setting items, in the case where the gesture receiving section receives the selection gesture performed on the shortcut button, the display control section causes the display section to:
(i) scroll the setting item list being displayed on the scrolling display area until a display range including the first image indicating the first name of the first setting item associated with the selected shortcut button is displayed in the scrolling display area;
(ii) change to the first setting candidate associated with the shortcut button; and
(iii) display the first image indicating the first name of the first setting item associated with the selected shortcut button in a display manner different from other images in the setting item list, and
in a case where the gesture receiving section receives a selection gesture performed on the shortcut button, the setting candidate receiving section receives the first change to the first setting candidate associated with the selected shortcut button.

10. The computer-readable non-transitory recording medium according to claim 9, wherein the computer-readable non-transitory recording medium stores the information processing program that causes the computer to function so that in a case where the gesture receiving section receives a selection gesture performed on one image among the first and second images respectively indicating each name of the first and second setting items in the setting item list, the display control section changes a screen to be displayed on the display section from the setting screen to a detail screen for changing the setting candidate of the setting item indicated in the selected one image.

* * * * *